(12) United States Patent
Christensen et al.

(10) Patent No.: US 12,461,738 B1
(45) Date of Patent: Nov. 4, 2025

(54) CLOUD BASED SERVICE FOR CUSTOMER ENTERPRISES

(71) Applicant: Cisco Technology, Inc., San Jose, CA (US)

(72) Inventors: Yann Christensen, Hailey, ID (US); Ritika Rasiwasia, Kirkland, WA (US); Kymberly Ann Hines, Kenmore, WA (US); Michael Emery, Whitby (CA); Fnu Rahul Muralinath, Newark, CA (US); Krishnan Anantheswaran, San Jose, CA (US); Gaurav Chawla, San Jose, CA (US); Aditya Nagnath Kamble, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/297,078

(22) Filed: Apr. 7, 2023

Related U.S. Application Data

(60) Provisional application No. 63/328,668, filed on Apr. 7, 2022.

(51) Int. Cl.
*G06F 8/65* (2018.01)
*H04L 43/10* (2022.01)

(52) U.S. Cl.
CPC ............... *G06F 8/65* (2013.01); *H04L 43/10* (2013.01)

(58) Field of Classification Search
None
See application file for complete search history.

(56) References Cited

U.S. PATENT DOCUMENTS

| | | | |
|---|---|---|---|
| 7,937,344 | B2 | 5/2011 | Baum et al. |
| 8,112,425 | B2 | 2/2012 | Baum et al. |
| 8,751,529 | B2 | 6/2014 | Zhang et al. |
| 8,788,525 | B2 | 7/2014 | Neels et al. |
| 9,215,240 | B2 | 12/2015 | Merza et al. |
| 9,286,413 | B1 | 3/2016 | Coates et al. |
| 10,127,258 | B2 | 11/2018 | Lamas et al. |
| 10,986,173 | B1 * | 4/2021 | Thomason .......... H04L 67/1021 |
| 2014/0123124 | A1 * | 5/2014 | Gray ....................... G06F 8/654 717/170 |
| 2016/0037057 | A1 * | 2/2016 | Westin .................... G06F 16/51 348/207.1 |
| 2016/0241441 | A1 * | 8/2016 | Jiang ................... H04L 41/0813 |

(Continued)

OTHER PUBLICATIONS

Splunk Enterprise 8.0.0 Overview, available online, retrieved May 20, 2020 from docs.splunk.com.

(Continued)

*Primary Examiner* — Bradley A Teets
*Assistant Examiner* — Clint Thatcher
(74) *Attorney, Agent, or Firm* — Kilpatrick Townsend & Stockton LLP

(57) ABSTRACT

Described herein is a framework for providing a cloud-based service that manages resources in one or more host machines (i.e., nodes) included in a customer enterprise deployment. A supervisor is instantiated in each node and communicates with a cloud-based enterprise configuration controller that is included in the cloud-based service. The cloud-based enterprise configuration controller provides a seamless manner to control and manage resources deployed on the one or more host machines included in the customer enterprise deployment.

18 Claims, 18 Drawing Sheets

(56) References Cited

U.S. PATENT DOCUMENTS

| | | | |
|---|---|---|---|
| 2017/0134519 A1* | 5/2017 | Chen | H04L 67/10 |
| 2019/0098106 A1 | 3/2019 | Mungel et al. | |
| 2019/0272498 A1* | 9/2019 | Swafford | H04W 4/80 |
| 2021/0004281 A1* | 1/2021 | Kuo | G06F 9/547 |
| 2023/0114232 A1* | 4/2023 | Purusothaman | H04L 63/062 |
| | | | 709/223 |

OTHER PUBLICATIONS

Splunk Cloud 8.0.2004 User Manual, available online, retrieved May 20, 2020 from docs.splunk.com.
Splunk Quick Reference Guide, updated 2019, available online at https://www.splunk.com/pdfs/solution-guides/splunk-quick-reference-guide.pdf, retrieved May 20, 2020.
Carraso, David, "Exploring Splunk," published by CITO Research, New York, NY, Apr. 2012.
Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

* cited by examiner

700

Transmit, by a node enterprise supervisor (NES), a heartbeat message to a cloud based enterprise configuration controller (CBECC), the heartbeat message including first metadata indicative of a current configuration of a package that is being executed on a node
702

Receive, by the NES, a heartbeat response message from the CBECC including second metadata indicative of whether the current configuration of the package is to be updated
704

Responsive to the current configuration of the package requiring to be updated, transmitting by the NES, a request message to a content delivery network to download an updated configuration of the package
706

Executing, by the NES, the downloaded version of the package in the node
708

Receive, by a cloud based enterprise configuration controller (CBECC), a heartbeat message from a node enterprise supervisor (NES), the heartbeat message including first metadata indicative of a current configuration of a package that is being executed by the NES
802

Determine by the CBECC, whether the current configuration of the package is to be updated
804

Responsive to a successful determination that the current configuration of the package is to be updated, transmit by the CBECC, a heartbeat response message to the NES including second metadata indicative of a new configuration of the package that is to be downloaded by the NES
806

Receive, by a package service deployed in a cloud environment, a request from an user interface to apply updated configuration settings to a package that is executed in one or more nodes in a customer enterprise
902

Publish by the package service, the update configuration settings to a cloud based enterprise configuration controller (CBECC)
904

Transmit by the CBECC, in response to receiving a heartbeat message from each of the one or more nodes, a heartbeat response message including the updated configuration settings
906

Transmit, by a server supervisor (SS), a heartbeat message to a cloud based enterprise configuration controller (CBECC), the heartbeat message including first metadata indicative of a current configuration of a server
1002

Receive, by the SS, a heartbeat response message from the CBECC including second metadata indicative of whether the current configuration of the server is to be updated
1004

Responsive to the current configuration setting of the server requiring to be updated, transmitting by the SS, a request message to a content delivery network to download an updated configuration of the server
1006

Executing, by the SS, the updated configuration in the server
1008

Receive, by a cloud based enterprise configuration controller (CBECC), a heartbeat message from a server supervisor (SS), the heartbeat message including first metadata indicative of a current configuration of a server
1102

Determine by the CBECC, whether the current configuration of the server is to be updated
1104

Responsive to a successful determination that the current configuration of the server is to be updated, transmit by the CBECC, a heartbeat response message to the SS including second metadata indicative of a new configuration of the server
1106

Receive, by a server service deployed in a cloud environment, a request from an user interface to apply updated configuration settings to a server in a customer enterprise
1202

Publish by the server service, the update configuration settings to a cloud based enterprise configuration controller (CBECC)
1204

Transmit by the CBECC, in response to receiving a heartbeat message from a server supervisor, a heartbeat response message including the updated configuration settings of the server
1206

FIG. 12

CLOUD BASED SERVICE FOR CUSTOMER ENTERPRISES

CROSS-REFERENCES TO RELATED APPLICATIONS

This application is a non-provisional of and claims the benefit of the filing date of U.S. Provisional Application No. 63/328,668, filed on Apr. 7, 2022, the contents of each of which are incorporated herein by reference in its entirety.

FIELD

The present disclosure relates to a cloud-based service that manages resources in a customer enterprise.

BACKGROUND

Modern information technology (IT) infrastructures e.g., data centers, customer enterprise networks, etc., often comprise thousands of computer systems that may operate collectively to service requests from even larger numbers of remote computing devices. In operation, such large-scale IT infrastructures generate significant volumes of performance data and diagnostic information that needs to be analyzed to diagnose performance and security problems. Software is utilized to manage the collection, storage, and analysis of such diagnostic information and performance data. The software may include components across the network, including at the data sources, at assigned storage locations, etc. For some network operators, the computer systems in such large-scale infrastructures are managed and/or controlled directly (e.g., behind a firewall of the enterprise) by a group of authorized personnel (e.g., administrators), who are employee-agents of the enterprise. Such large-scale infrastructures, where the network operator itself administers the computer systems that make up the infrastructures, are referred to as customer managed environments or self-managed environments.

BRIEF DESCRIPTION OF THE DRAWINGS

Features, implementations, and advantages of the present disclosure are better understood when the following Detailed Description is read with reference to the accompanying drawings.

FIG. 7 illustrates a simplified flowchart depicting steps performed by a node enterprise supervisor, according to certain implementations.

FIG. 8 illustrates a simplified flowchart depicting steps performed by the cloud-based enterprise configuration controller according to certain implementations.

FIG. 9 illustrates a simplified flowchart depicting steps performed by a cloud-based enterprise service in updating one or more configuration parameters of a package on one or more nodes of a customer enterprise, according to certain implementations.

FIG. 10 illustrates a simplified flowchart depicting steps performed by a server/engine supervisor, according to certain implementations.

FIG. 11 illustrates another simplified flowchart depicting steps performed by the cloud-based enterprise configuration controller according to certain implementations.

FIG. 12 illustrates a simplified flowchart depicting steps performed by a server service deployed in a cloud environment according to certain implementations.

DETAILED DESCRIPTION

Figure 1:
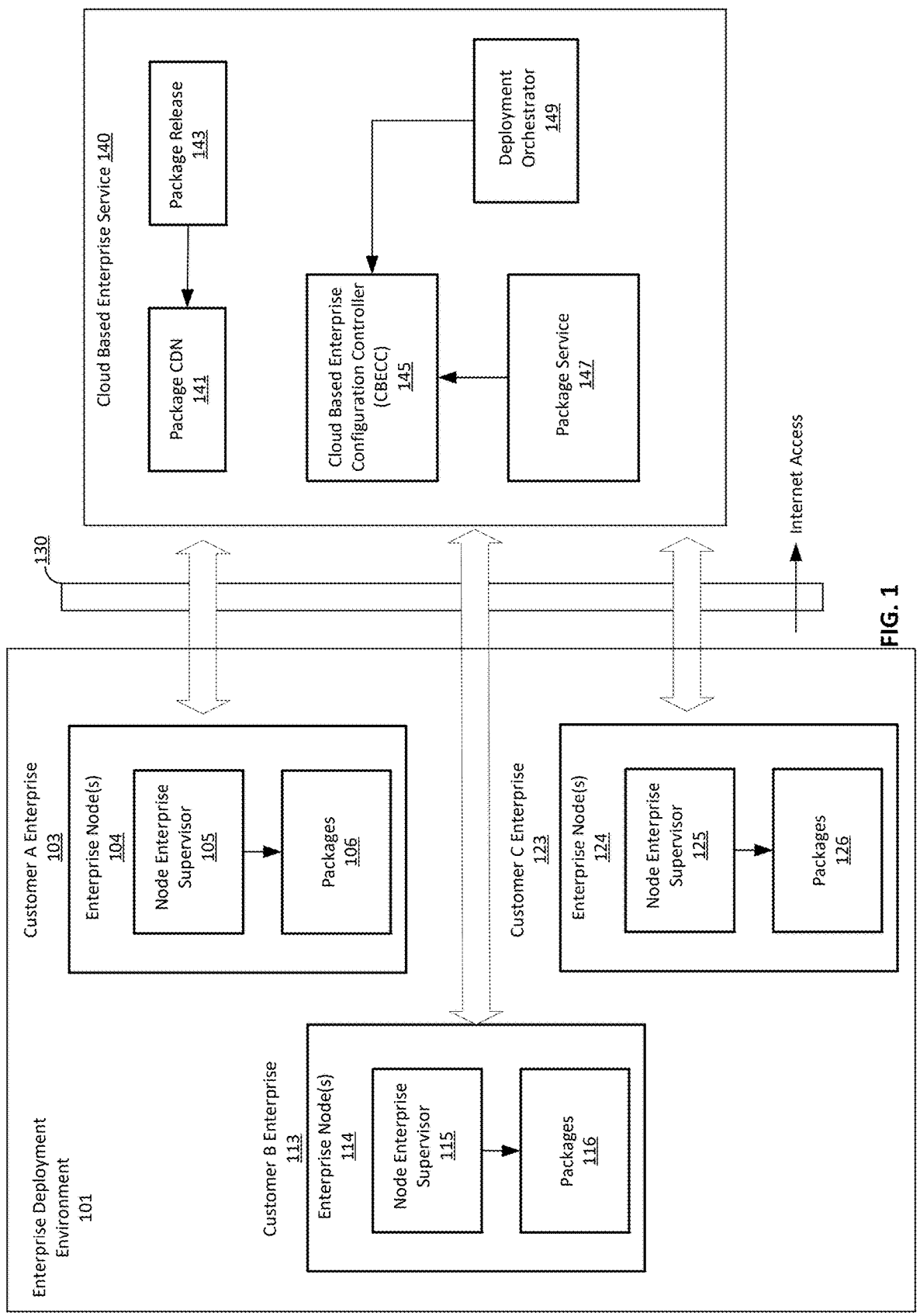
FIG. 1 is a high-level diagram of an enterprise deployment environment that is managed by a cloud-based enterprise service according to certain implementations.

In the following description, for the purposes of explanation, specific details are set forth in order to provide a thorough understanding of certain implementations. However, it will be apparent that various implementations may be practiced without these specific details. The figures and description are not intended to be restrictive. Any implementation or design described herein as example is not necessarily to be construed as preferred or advantageous over other implementations or designs.

Entities of various types, such as companies, educational institutions, medical facilities, governmental departments, and private individuals, among other examples, operate large-scale information technology ecosystems for various purposes. An information technology ecosystem includes infrastructures of various kinds of computing resources including computer systems, servers, storage systems, network communication devices, or any other electronic resources. In such information technology ecosystems (also referred to herein as customer enterprises), the computing resources may be managed by authorized personnel of the enterprise (e.g., administrators). For instance, software may be deployed on the computing resources of the enterprise for the purpose of data collection, data storage, and data analytics. The authorized personnel of the enterprise may handle the management and administration of such a large-scale software deployment behind a firewall of the enterprise.

Computing environments, which can also be referred to as information technology environments, can include internetworked, physical hardware devices, the software executing on the hardware devices, and the users of the hardware and software. As an example, an entity such as a school can operate a Local Area Network (LAN) that includes desktop computers, laptop computers, smart phones, and tablets connected to a physical and wireless network, where users correspond to teachers and students. In this example, the physical devices may be in buildings or a campus that is controlled by the school.

As another example, an entity such as a business can operate a Wide Area Network (WAN) that includes physical devices in multiple geographic locations where the offices of the business are located. In this example, the different offices can be inter-networked using a combination of public networks such as the Internet and private networks. As another example, an entity can operate a data center: a centralized location where computing resources are kept and maintained, and whose resources are accessible over a network. In this example, users associated with the entity that operates the data center can access the computing resources in the data center over public and/or private networks that may not be operated and controlled by the same entity. Alternatively, or additionally, the operator of the data center may provide the computing resources to users associated with other entities, for example on a subscription basis. In both of these examples, users may expect resources to be available on demand and without direct active management by the user, i.e., a resource delivery model often referred to as cloud computing.

Entities that operate computing environments need information about their computing resources. For example, an entity may need to know the operating status of the various computing resources in the entity's computing environment, so that the entity can administer the environment, including performing configuration and maintenance, performing repairs or replacements, provisioning additional resources, removing unused resources, or addressing issues that may arise during operation of the computing environment, among other examples. As another example, an entity can use information about a computing environment to identify and remediate security issues that may endanger the data, users, and/or equipment in the computing environment. As another example, an entity may be operating a computing environment for some purpose (e.g., to run an online store, to operate a bank, to manage a municipal railway, etc.) and information about the computing environment can aid the entity in understanding whether the computing environment is serving its purpose well.

To obtain information about its computing environments, an entity can use software designed for this purpose. This software can be deployed across a computing environment, such as, for example, on some or all of the various computing devices that make up the computing environment. In some cases, the entity may manage such a software deployment itself, for example by having employees assigned to manage the software deployment, who have the proper network authorization to do so. The management functions are handled within the entity's computing environment and within the security and access boundaries (e.g., the firewall) of the computing environment. Such an environment may be referred to as a self-managed environment.

In self-managed environments, a frequently encountered problem is that of scalability. As the IT ecosystem grow in size, managing deployment and administration of software in the individual nodes (i.e., compute resources of the environment) becomes increasingly difficult. As such, a new service with a new architecture is required that is capable of delivering software and configuration updates to customer environments in a seamless and scalable manner. As described herein, there is provided a cloud-based mechanism for delivering and managing software services to various customer environments. Specifically, a cloud-based service manages resources in one or more host machines included in a customer enterprise deployment. A supervisor that is instantiated in each node, communicates with a configuration controller included in the cloud-based service. The configuration controller provides a seamless manner to control and manage resources deployed on one or more host machines included in the customer enterprise deployment(s).

Turning now to FIG. 1, there is depicted a high-level diagram of an enterprise deployment environment that includes software that is managed by a cloud-based enterprise service according to certain implementations. As shown in FIG. 1, an enterprise deployment environment 101 includes a plurality of customer enterprises. For instance, the enterprise deployment environment 101 includes a first customer enterprise (i.e., customer A enterprise 103), a second customer enterprise (i.e., customer B enterprise 113), and a third customer enterprise (i.e., customer C enterprise 123). Each of the first, second, and third customer enterprises include software that is managed by a cloud-based enterprise service 140 i.e., the first, second, and the third customer enterprises are customers of the cloud-based enterprise service. The cloud-based enterprise service 140 is also referred to herein as a cloud service 140 or a cloud service infrastructure 140. The customer enterprises communicate with the cloud service 140 over a public network e.g., the Internet. It is appreciated that the enterprise deployment environment 101 may make use of the services offered by the cloud service 140 via a firewall 130. The enterprise deployment environment 101 is shown to include three customer enterprises for the sake of illustration. However, this is in no way limiting the scope of the present disclosure, and it is appreciated that the enterprise deployment environment 101 may include any number of customer enterprise(s).

Each customer enterprise may include one or more nodes i.e., computing resources that execute one or more software packages. A software package (also referred to herein as simply a package) is a standalone software unit that is defined by an application binary and configuration setting(s) of the application. For instance, as shown in FIG. 1, customer A enterprise 103 includes one or more nodes that execute packages 106, customer B enterprise 113 includes one or more nodes that execute packages 116, and customer C enterprise 123 includes one or more nodes that execute packages 126, respectively.

According to some implementations, each node within a customer enterprise includes an instance of a node enterprise supervisor. For example, as shown in FIG. 1, an enterprise node 104 (included in customer A enterprise 103) comprises a node enterprise supervisor 105, whereas enterprise node 114 (included in customer B enterprise 113) comprises a node enterprise supervisor 115, and enterprise node 124 (included in customer C enterprise 123) comprises a node enterprise supervisor 125. Each of the node enterprise supervisors corresponds to a client-side software (e.g., host process) that brokers communication between the cloud service and the individual package(s) that are executing on the node. Moreover, each supervisor may be programmed to manage: (a) downloading of a package from the cloud service 140, and (b) executing and updating packages deployed on the node. In some implementations, a node enterprise supervisor can be uniquely identified by a self-generated identifier (i.e., ID) and can execute one or more packages on the node, where each package is associated with a unique configuration setting.

The cloud service 140 includes a package content delivery network 141, a package release unit 143, a cloud based enterprise configuration controller 145 (referred to herein as a configuration controller), a package service 147, and a deployment orchestrator 149. The package release unit 143 is programmed to publish a new version of a package and make the new version available for deployment. In some implementations, the new version of the package is released to the package content delivery network 141. The node supervisors (associated with enterprise node(s)) communicate with the package content delivery network 141 to obtain the latest version of a particular package. The configuration controller 145 manages, monitors package instances, and orchestrates deployments of packages (and configuration settings of the packages) in the enterprise node(s). In other words, the configuration controller 145 is configured to ensure that the latest version of a package is up and running on an enterprise node. Additionally, it is noted that the cloud service cloud service 140 may be provided/executed in different geographical locations (i.e., regions) to service the enterprise deployments in the corresponding geographical locations.

The package service 147 provides domain-specific application interface(s) (i.e., APIs) in the cloud that may be used by packages for package configuration administration. The deployment orchestrator 149 can be configured to push (via the configuration controller 145) updates for a particular package(s) on all nodes of a particular enterprise i.e., on a global level. Moreover, the deployment orchestrator 149 can be utilized in conjunction with the package service 147 in incrementally updating packages on a set of one or more nodes. Details regarding the interactions of the cloud service 140 with the node enterprise supervisors is described next with reference to FIGS. 2 and 3, respectively. For sake of simplicity, the interactions are described with regard to a single customer enterprise but are equally applicable to all customer enterprises included in the enterprise deployment environment 101 of FIG. 1. Furthermore, it is appreciated that the embodiment depicted in FIG. 1 is in no way limiting the scope of the present disclosure. For instance, although the node enterprise supervisors are depicted as being deployed in an enterprise deployment environment, it is noted that the node enterprise supervisors may be deployed in a cloud platform environment and managed by the cloud based enterprise configuration controller.

Figure 2:
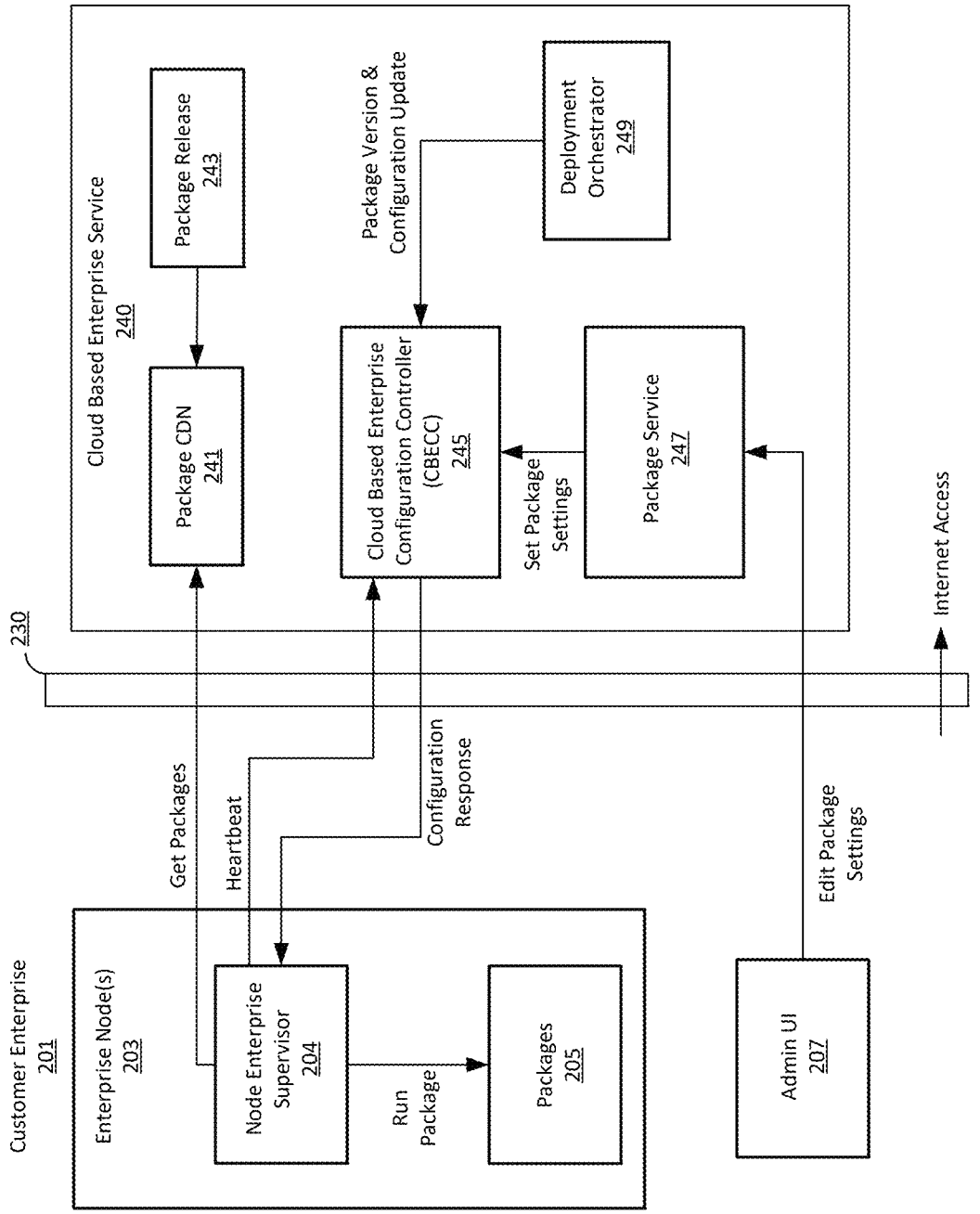
FIG. 2 depicts a customer enterprise that is managed by a cloud-based enterprise service according to certain implementation.

FIG. 2 depicts a customer enterprise that includes software that is managed by the cloud service according to certain implementations. Specifically, a customer enterprise 201 includes one or more enterprise nodes 203, where packages executed on the respective one or more enterprise nodes 203 are managed by cloud service 240. In some implementations, each node within the customer enterprise 201 comprises a node enterprise supervisor 204 that downloads (from the cloud service 240) and executes the downloaded packages 205 on the node. It is noted that the cloud service 240 is secured from the customer enterprises via a firewall 230. The node enterprise supervisor 204 communicates with the cloud service 240 over a public network such as the Internet. The cloud service 240 includes a package content delivery network 241, a package release unit 243, a configuration controller 245, a package service 247, and a deployment orchestrator 249. It is appreciated that the functionally of the individual components of the cloud service 240 are similar to the functionality of the components of the cloud service 140 described above with reference to FIG. 1.

In one implementation, the node enterprise supervisor 204 of FIG. 2 transmits a recurring heartbeat message to the configuration controller 245 included in the cloud service 240. The heartbeat message sent from the node enterprise supervisor 204 to the configuration controller 245 announces the supervisor instance's existence, and includes metadata (e.g., first metadata) that identifies labels, a current configuration (i.e., a version of the package and/or configuration settings of the package) of a package that is executed on the node. Additionally, the first metadata may include information indicative of a metric associated with the node enterprise supervisor. For instance, the metric may correspond to a health metric of the node enterprise supervisor 204, which contains time-series data-points that are used to capture health and other operational data of the node enterprise supervisor. Moreover, the frequency of transmitting the heartbeat messages may be in the order of a few minutes e.g., every ten minutes. In some implementations, the node enterprise supervisor 204 may utilize other communication mechanisms to enable the cloud service 240 to asynchronously initiate communication with the node enterprise supervisor 204 and thus reduce communication latency. For example, a long polling request-response channel or a bi-directional communication channel may be established between the node enterprise supervisor 204 and the configuration controller 245 (included in the cloud service 240) to exchange information in a seamless manner.

The configuration controller 245 upon receiving a heartbeat message determines whether the package executed by the node enterprise supervisor is up to date. In other words, the configuration controller 245 determines whether the package executed by the node enterprise supervisor is to be updated. With regard to updating a package, the configuration controller 245 may determine whether a version of the package is to be updated and/or whether one or more configuration settings associated with the package are to be updated. It is appreciated that the configuration controller 245 may perform such a determination by comparing the metadata of the package that is included in the heartbeat message transmitted from the node enterprise supervisor to information (i.e., version and/or configuration settings) of a newer package, for example that is published to the package content delivery network 241.

Responsive to receiving the heartbeat message, the configuration controller 245 transmits a configuration response message back to the node enterprise supervisor 204. Upon successfully determining that a current package (i.e., the package currently being executed on the node) is to be updated (e.g., version of the package and/or configuration setting(s) of the package have changed), the configuration controller 245 transmits a configuration response message back to the node enterprise supervisor 204. The configuration response message includes metadata (e.g., second metadata) indicative of a newer version and/or configuration settings of the package, and a location on the package content delivery network 241 (e.g., an URL) from where the node enterprise supervisor 204 may download the required updated package. Upon receiving the above-described configuration response message, the node enterprise supervisor 204 communicates with the package content delivery network 241 to download the updated package and executes the downloaded package on the node. In some implementations, the configuration response message includes configuration settings that may be classified as one of a secret configuration setting (e.g., configuration settings used for authentication purposes) or a non-secret configuration setting. As secret configuration settings are confidential in nature, they may be transmitted from the configuration controller 245 to the node enterprise supervisor 204 in a manner that is different than the transmission of non-secret configuration settings. For instance, the non-secret configuration settings may be included in the metadata of the configuration response message. In contrast, the secret configuration settings may be included in a separate data object included in the heartbeat response messages. In this manner, the secret configuration setting may be processed separately from the non-secret configuration settings, while ensuring that the secret configuration settings is not persisted to a storage location that is not properly protected from unauthorized access. In contrast, when the configuration controller 245 determines that the current package is not required to be updated i.e., the version of the package and the one or more configuration settings of the package are up to date, then the configuration controller 245 transmits the configuration response message to the node enterprise supervisor simply indicating that no updates are required.

In another implementation, an administrator of the customer enterprise 201 may edit one or more configuration settings of a package that are to be executed across several nodes within the customer enterprise 201. For example, the administrator may utilize an administrator user interface (UI) 207 to transmit, one or more edited configuration settings to the package service 247. The package service 247 upon receiving the edited one or more configuration settings, publishes the edited one or more configuration settings to the configuration controller 245. In turn, the configuration controller 245 transmits the edited one or more configuration settings to the respective node enterprise supervisors (of the nodes included in the customer enterprise 201) in heartbeat response messages that are transmitted to the respective nodes upon the configuration controller 245 receiving heartbeat messages from the nodes.

In some implementations, the cloud service 240 may utilize the deployment orchestrator 249 in conjunction with the package service 247. For instance, in the case of updating the one or more configuration settings on one or more nodes of the customer enterprise 201, the deployment orchestrator 249 may be programmed to update the configuration settings on the set of one or more nodes in an incremental fashion. Specifically, the deployment orchestrator 249 may instruct the configuration controller 245 to update the configuration setting on a first node and verify whether a heartbeat message transmitted from the first node is okay, before proceeding to update the configuration setting on subsequent node. Moreover, the deployment orchestrator 249 may also be configured to perform a rollback operation i.e., the deployment orchestrator 249 may instruct the configuration controller 245 to revert back to a previous version of the package in case of any issues being faced while updating the set of one or more nodes.

The cloud service can be utilized to manage resources in customer enterprises in a variety of applications. For instance, customer enterprises can include a server/engine referred to as an edge routing device or edge server. In such an example, the server can act as an intermediate forwarder between different sources. Specifically, in an enterprise setting, customer(s) perform data processing operations such as data filtering, transform operations, data reductions, etc. The processed data is desired to be stored in different data storages. For example, a first portion of the data may be stored in a first data storage at a first geographical location, and a second portion of the data may be stored in a second data storage at a second geographical location (different than the first geographical location). In such a scenario, the server may be used as an intermediate forwarder to route specific data to a desired storage devices.

The server can be characterized by configuration settings that enable the server to perform the desired tasks. In such an enterprise setting, there are a plurality of such servers that perform the above-described data processing operations. Typically, a user with sufficient privileges (e.g., an administrator) would have to manually set the configuration settings on each server. When a customer enterprise includes tens or even only hundreds of such servers, manually configuring each one is not feasible. In what follows, there is described with reference to FIG. 3, a mechanism to utilize the cloud service to manage such servers in a customer's enterprise.

Figure 3:
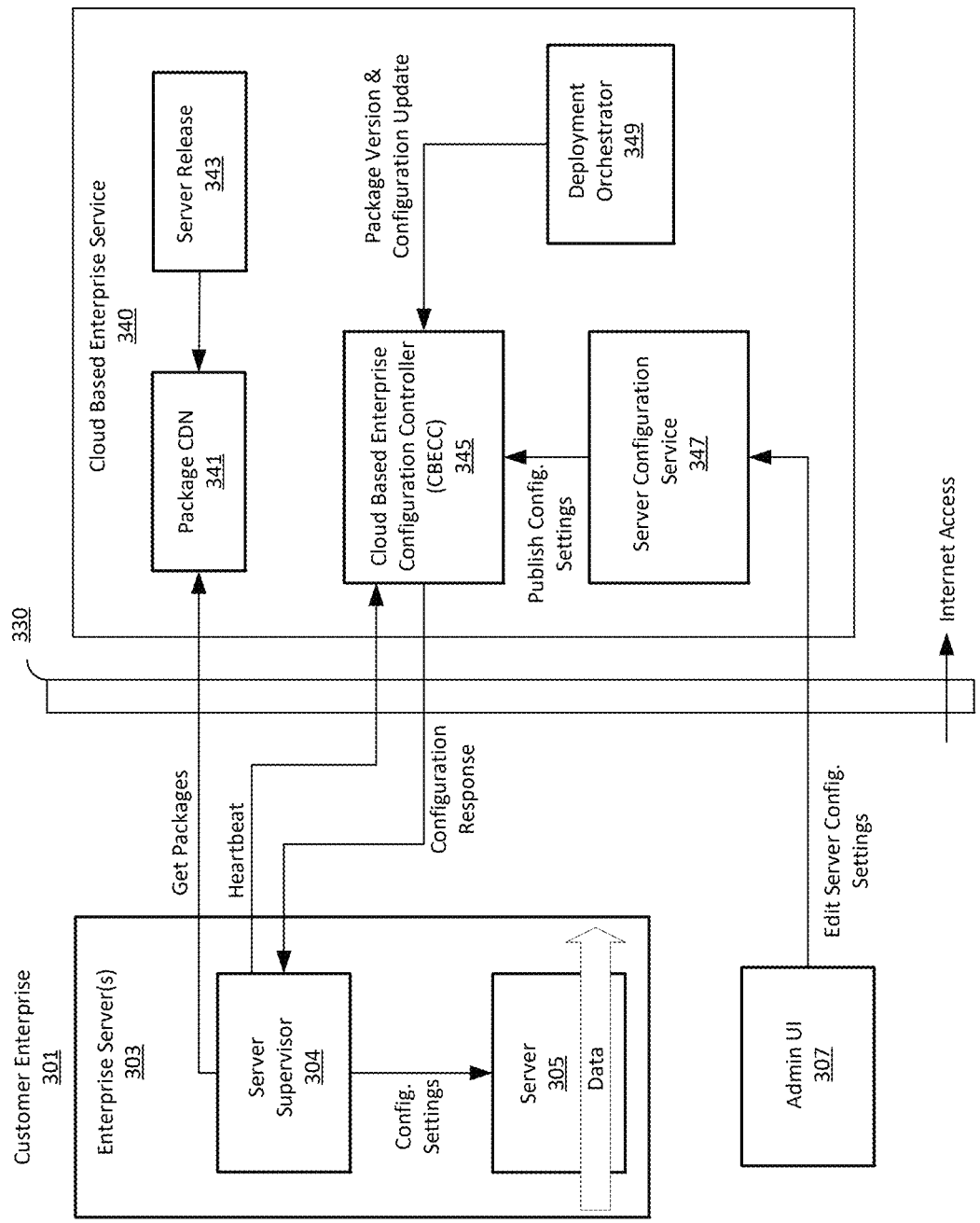
FIG. 3 depicts another customer enterprise implementation that is managed by the cloud-based enterprise service.

FIG. 3 depicts another customer enterprise implementation that includes software that is managed by the cloud service. An example customer enterprise 301 includes one or more servers 303 (i.e., edge servers that act as intermediate forwarders between data sources). For instance, an edge server 305 in the customer enterprise forwards data to different data sources. In some implementations, each server within the customer enterprise 301 comprises a server supervisor 304 that downloads (from a cloud service 340) and installs packages on the server. It is noted that the cloud service 340 is secured from the customer enterprise 301 via a firewall 330. The server supervisor 304 communicates with the cloud service 340 over a public network such as the Internet.

The cloud service 340 includes a package content delivery network 341, a server release unit 343, a configuration controller 345, a server configuration service 347, and a deployment orchestrator 349. It is appreciated that the functionally of the individual components of the cloud service 340 are similar to the functionality of the components of the cloud service 240 described above with reference to FIG. 2.

In one implementation, the server supervisor 304 of FIG. 3 transmits a recurring heartbeat message to the configuration controller 345 included in the cloud service 340. The heartbeat message sent from the server supervisor 304 to the configuration controller 345 announces the supervisor instance's existence, identifies label metadata, and current configuration of a package that is executed on the server. Specifically, each heartbeat message may include metadata (e.g., first metadata) that includes the above stated information as well as includes information indicative of a metric associated with the server supervisor. For instance, the metric may correspond to a health metric of the server supervisor 304, which contains time-series data-points that are used to capture health and other operational data of the server supervisor. Moreover, the frequency of transmitting the heartbeat messages may be in the order of a few minutes e.g., every ten minutes.

The configuration controller 345 upon receiving a heartbeat message determines whether the package executed by the server supervisor is up to date. In other words, the configuration controller 345 determines whether the package executed by the server supervisor is to be updated. With regard to updating a package, the configuration controller 345 may determine whether a version of the package is to be updated and/or whether one or more configuration settings associated with the package are to be updated. It is appreciated that the configuration controller 345 may perform such a determination by comparing the metadata of the package that is included in the heartbeat message transmitted from the server supervisor to information (i.e., version and/or configuration settings) of a newer package that is, for example, published to the package content delivery network 341 via the server release unit 343.

Responsive to receiving the heartbeat message, the configuration controller 345 transmits a configuration response message back to the server supervisor 304. Upon successfully determining that a current package (i.e., the package currently being executed on the server) is to be updated (e.g., version of the package and/or configuration setting(s) of the package have changed), the configuration controller 345 transmits a configuration response message back to the server supervisor 304. The configuration response message includes metadata (e.g., second metadata) indicative of a newer version and/or configuration settings of the package, and a location on the package content delivery network 341 (e.g., an URL) from where the server supervisor 304 may download the required updated package. Upon receiving the above-described configuration response message, the server supervisor 304 communicates with the package content delivery network 341 to download the updated package and executes the downloaded package on the server 305. In contrast, when the configuration controller 345 determines that the current package is not required to be updated i.e., the version of the package and the one or more configuration settings of the package are up to date, then the configuration controller 345 transmits the configuration response message to the server supervisor simply indicating that no updates are required.

In another implementation, an administrator of the customer enterprise 301 may edit one or more configuration settings of a package (executed on a server) across several server deployments within the customer enterprise 301. For example, the administrator may utilize an administrator user interface (UI) 307 to transmit one or more edited configuration settings to the server configuration service 347. The server configuration service 247, upon receiving the edited one or more configuration settings, publishes the edited one or more configuration settings to the configuration controller 345. In turn, the configuration controller 345 transmits the edited one or more configuration settings to the respective server supervisors (of the servers included in the customer enterprise 301) in heartbeat response messages that are transmitted to the respective server supervisors in response to the configuration controller 345 receiving heartbeat messages from the server supervisors. Upon receiving the updated configuration setting(s), the server supervisors execute the configuration settings on the respective servers. In this manner, the cloud service 340 provides a seamless mechanism to manage edge servers in a customer enterprise.

Figure 4:
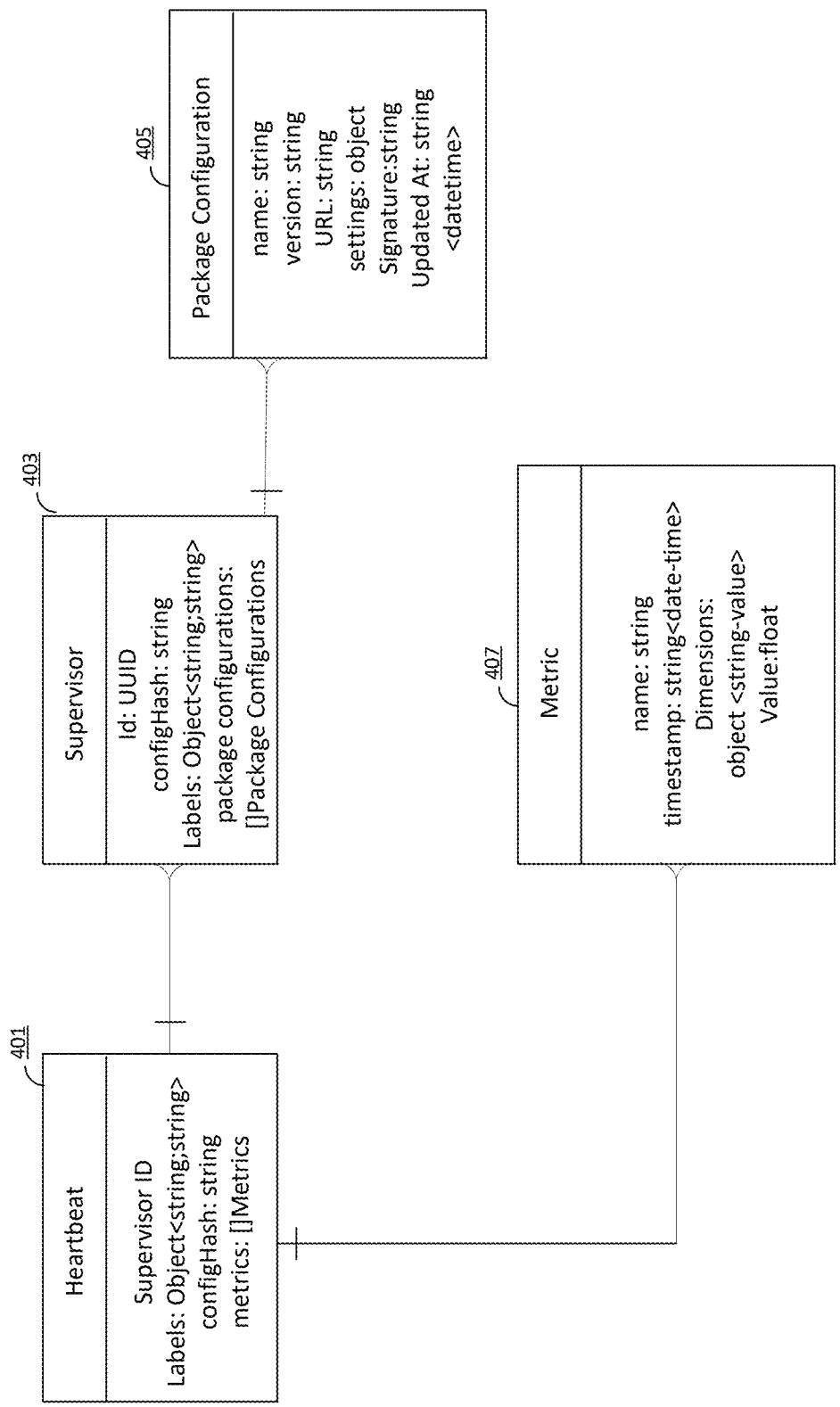
FIG. 4 depicts a relational diagram illustrating objects and their respective attributes that are exchanged between a supervisor and a cloud-based enterprise configuration controller.

Turning to FIG. 4, there is depicted an example of a relational diagram illustrating objects and their respective attributes that are exchanged between a supervisor and a cloud based enterprise configuration controller. The heartbeat message 401 is a recurring message sent from a supervisor to the configuration controller to announce the supervisor instance's existence. As shown in FIG. 4, the heartbeat message 401 includes a supervisor identifier (ID), labels that include metadata to facilitate grouping, a configuration hash that corresponds to a current configuration state, and metrics such as health metrics of the node.

The package configuration 405 corresponds to an object that is transmitted by the configuration controller in response to receiving the heartbeat message. The heartbeat response message indicates if the supervisor instance needs to update its software packages or their settings. In some implementations the package configuration object includes information pertaining to a name of the configuration, a version of the configuration, a URL where the configuration may be downloaded from (e.g., from content delivery network network), configuration settings and a timestamp indicating as to when the settings were updated. A supervisor represents a 'host' or 'lifecycle manager' that runs in the client environment and hosts one or more downloadable packages and their configuration. Each supervisor instance heartbeats continuously to the configuration controller to announce its initial presence and then its current configuration and health on an ongoing basis.

As shown in FIG. 4, the supervisor object 403 includes an ID of the supervisor and a configuration hash that corresponds to a configuration identifier unique to the current configuration of the supervisor instance. In some implementations, the configuration hash specifically is the hash of a package configurations field. It is appreciated that this field can be used to efficiently compare if there are any deltas (i.e., changes) in a current and target configuration. Furthermore, the supervisor object 403 includes a package configuration list that corresponds to a list of package versions and configurations that the supervisor is configured to use. Further, the metric object contains a time-series data points that are used to capture health and other operational data about a supervisor (i.e., node enterprise supervisor). The supervisor sends metric data in its heartbeat message. The metric object 407 includes a name of the metric, a time stamp when the metric was observed, and the observed value of the metric.

Figure 5:
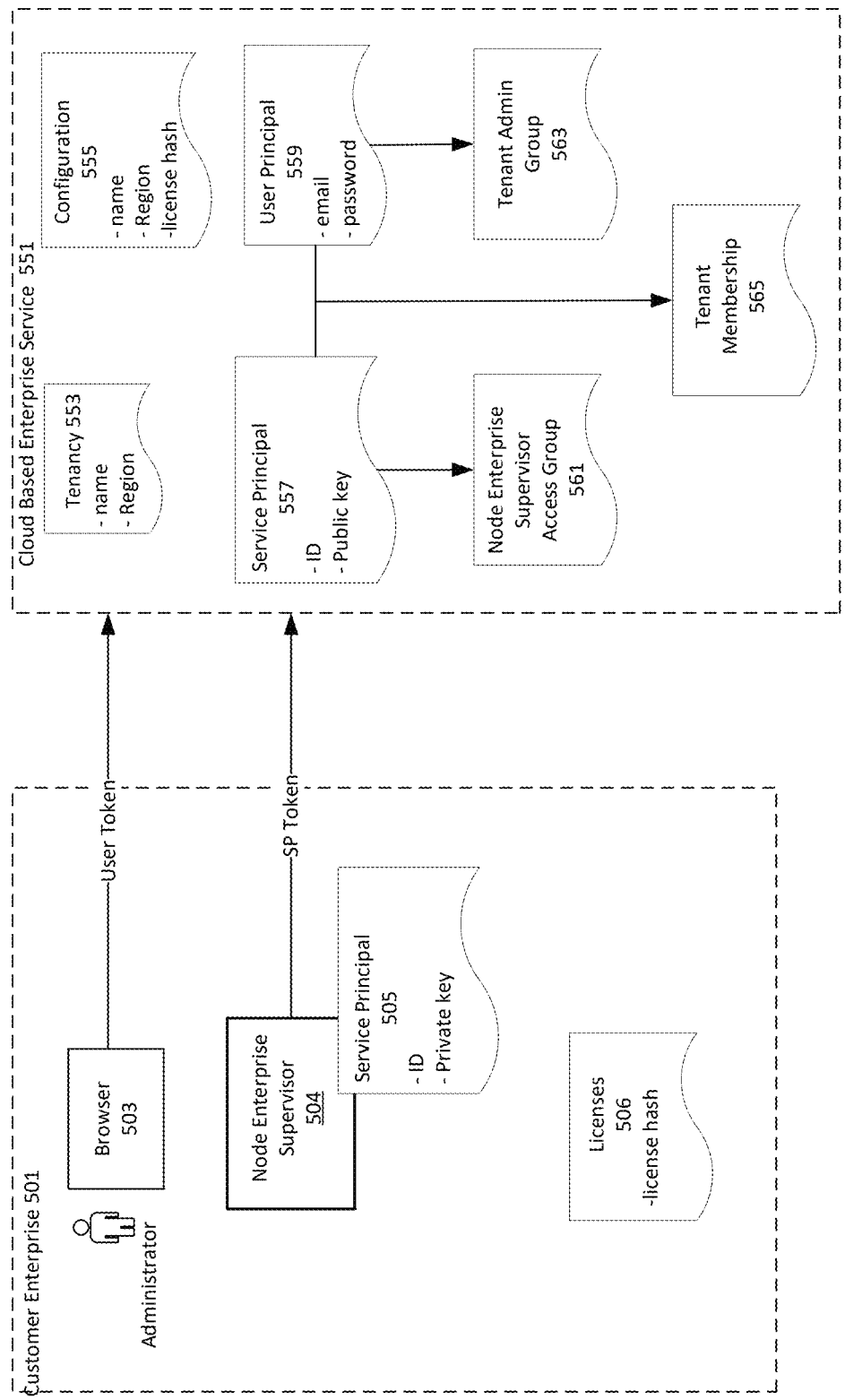
FIG. 5 depicts a high-level diagram illustrating resources created in an onboarding process of a customer.

FIG. 5 depicts a high-level diagram illustrating resources generated in an onboarding process of a customer. The process of onboarding a customer broadly relates to the generation of a tenancy (e.g., an account) for the customer so that the customer can avail services offered by a cloud-based enterprise service. To scale and to provide a modern cloud experience, enterprise customers should be able to self-service onboard. One difficulty with self-service onboarding is establishing trust with actors that have no cloud identity, mitigating any threats to unauthenticated onboarding APIs while still providing a low-friction user experience. More generally, onboarding entails establishing the right cloud resources (tenant, user accounts, client secrets, and "trust") so that enterprise users and client processes can access authenticated cloud APIs.

In some implementations, the process of onboarding a customer involves the following steps: (1) generating a new a cloud tenancy, (2) installing a supervisor e.g., a node enterprise supervisor, (3) establishing authenticated service-to-service connections for node enterprise supervisors to the cloud based enterprise service, (4) validating customer licenses and subscriptions, and (5) establishing user identities for user administrators.

FIG. 5 depicts resources that are generated in a customer enterprise 501 and in a cloud-based enterprise service (cloud service) 551 as a result of the onboarding process. A node enterprise supervisor 504 is instantiated with respect to each node included in the customer enterprise. A user e.g., an administrator of the customer enterprise 501 may access the cloud-based enterprise service 551 via a browser 503. The customer enterprise is associated with one or more licenses 506. A service principal (i.e., an identity) is provisioned for an application executed in the customer enterprise to perform a service-to-service authentication to cloud services. In other words, the service principal functions as an identity of the application and may define parameters including what resource(s) can be accessed by the application. As shown in FIG. 5, the service principal 505 on the customer enterprise side is associated with a principal ID and a private key, whereas the corresponding service principal 557 included in the cloud service 551 includes the principal ID and a public key. It is noted that the public-private key pair is generated on the client side (i.e., the customer enterprise 501) and only the public key is transmitted to the cloud service 551.

A configuration object 555 is generated in the cloud service for each customer enterprise deployment. The configuration object 555 is used for bootstrapping customer onboarding, and includes parameters such as a name, a region, and a hash of a license that associates the configuration object 555 to a particular customer enterprise. An identity (e.g., user principal 559) is created in the cloud service 551 for an administrator of the customer enterprise. The user principal is associated with an information related to the administrator e.g., an email address and password combination that is set by the administrator in the region. A tenancy 553 is created in the cloud service 551 that includes a user-friendly name of the tenancy and a region in which the tenancy included. It is appreciated that the tenancy 553 is related to the customer enterprise deployment 501 via a license key. Further, a tenant administrator group 563 is created to include the identities of one or more administrative accounts (associated with one or more administrators of the customer enterprise). A tenant membership 565 includes a list of all users and administrators of the customer enterprise that have access to the cloud service 551. Furthermore, it is noted that the service principal 557 included in the cloud service 551 is a tenant member (i.e., associated with node enterprise supervisor access group 561) and has access (i.e., can communicate with) the node enterprise supervisor 504. It is appreciated that the above-described onboarding process is in no way limiting the scope of the present invention. Other mechanisms may be implemented to onboard a customer. For instance, a customer may obtain an 'onboarding code' to be successfully on boarded to the cloud service 551.

Figure 6:
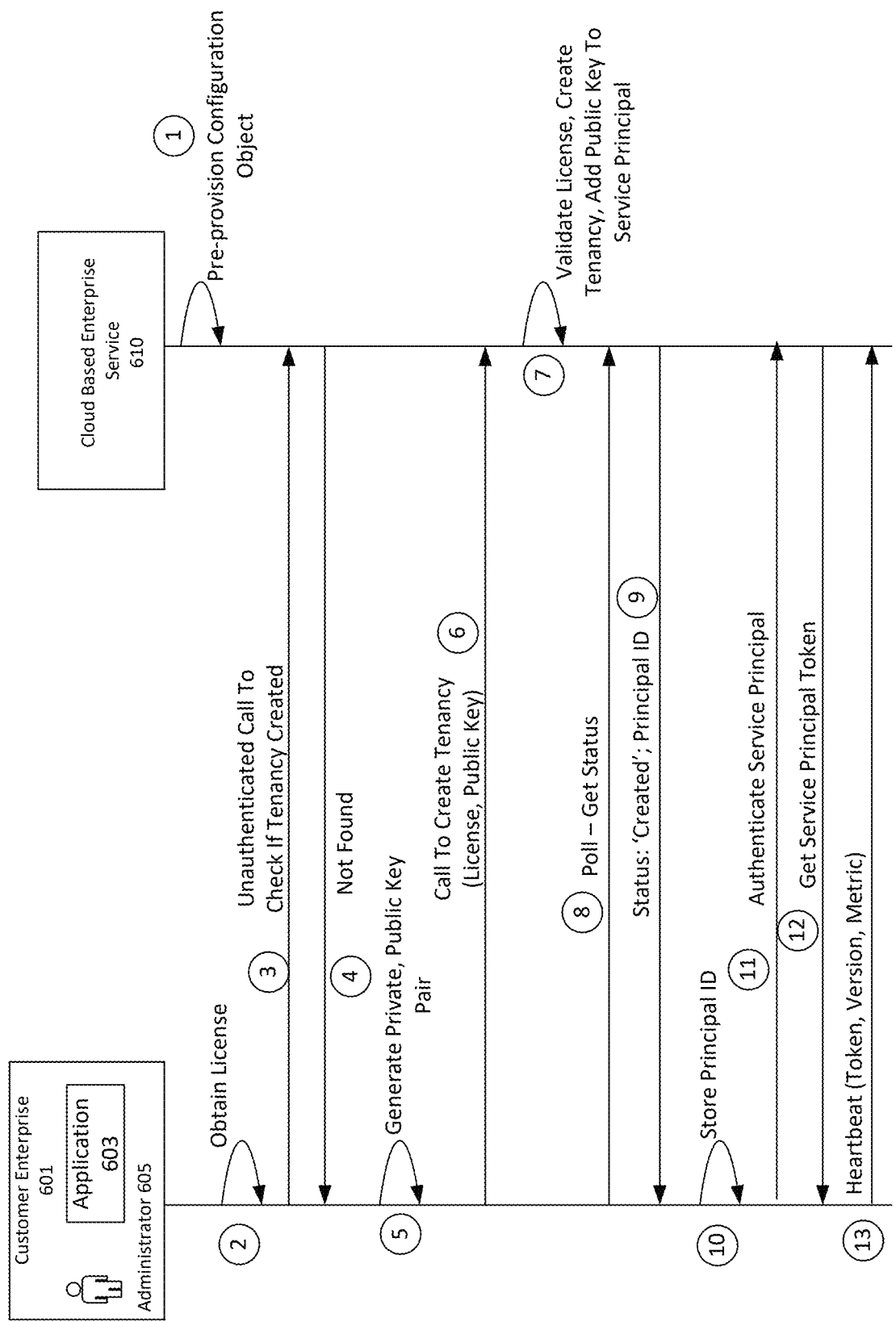
FIG. 6 is a flow diagram illustrating a customer onboarding process.

FIG. 6 is a flow diagram illustrating a customer onboarding process. For instance, FIG. 6 illustrates messages exchanged between a node in a customer enterprise 601 and a cloud-based service (cloud service) 610. It is appreciated that the node in the customer enterprise may execute a package i.e., an application 603, and be associated with an enterprise administrator 605.

In step 1, a configuration object is pre-provisioned in the cloud service 610. In some implementations, there is a single configuration object provisioned per customer enterprise. Further, the configuration object (e.g., configuration object 555 as shown in FIG. 5) is characterized by a plurality of parameters such as a name, a region, and a license hash (associated with a customer enterprise license).

In step 2, the application 603 executed on the node in the customer enterprise obtains a copy of the license (e.g., from the administrator). In step 3, the application 603 makes an unauthenticated call (i.e., a query) to the cloud service 610 to check whether a tenancy is created (by the cloud service) in the cloud environment for the customer enterprise 601. As the customer enterprise 601 has not yet been on-boarded to utilize the services of the cloud service 610, in step 4, the cloud service 610 transmits a response message back to the application 603 indicating that a customer tenancy has not yet been created for the customer enterprise.

In step 5, the application 603 generates a key pair including a public key and a private key. The private key is stored locally in the node e.g., in a password configuration file. In step 6, a request is transmitted from the node in the customer enterprise 601 to the cloud service 610 to create a tenancy for the customer. In some implementations, the request includes the license (obtained in step 2) and the public key (generated in step 5). In step 7, the cloud service 610 validates the license based on the pre-provisioned configuration object (generated in step 1). Upon successful validation, the cloud service 610 creates a tenancy for the customer enterprise 601 and adds the public key to a service principal (e.g., service principal 557 of FIG. 5).

In step 8, the application 603 of FIG. 6 may poll the cloud service 610 to obtain status with respect to the request made in step 6. In step 9, the cloud service 610 responds with a message indicating that the tenancy is created for the customer enterprise, and also provides a principal identifier (i.e., principal ID) for the customer enterprise. The principal ID corresponds to an identifier that is used by the customer enterprise in future communications with the cloud service 610. In step 10, the application 603 stores the principal ID obtained in step 9. In step 11, the application transmits a request to authenticate the service principal on the customer enterprise side (e.g., service principal 505 of FIG. 5). In step 12, the cloud service 610 transmits a token (referred to herein as SP token) which corresponds to a token associated with the service principal. The node in the customer enterprise 601 utilizes the obtained SP token in heartbeat messages that are transmitted periodically by the node to report, for instance, a version, configuration settings, metric health of the node, etc., to the cloud service 610. In this manner, the customer enterprise 601 is on boarded to the cloud service 610.

FIG. 7 illustrates a simplified flowchart 700 depicting steps performed by a node enterprise supervisor, according to certain implementations. The processing depicted in FIG. 7 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 7 and described below is intended to be illustrative and non-limiting. Although FIG. 7 depicts the various processing steps occurring in a particular sequence or order, this is not intended to be limiting. In certain alternative implementations, the steps may be performed in some different order or some steps may also be performed in parallel.

The process commences in step 702, where a node enterprise supervisor, e.g., the node enterprise supervisor, 204 of FIG. 2, transmits a heartbeat message to a configuration controller (e.g., configuration controller 245 of FIG. 2). The heartbeat message includes first metadata indicative of a current configuration of a package that is being executed on a node. It is noted that the current configuration may include information pertaining to a version of the package and/or one or more configuration settings of the package that is executed on the node. The heartbeat message may correspond to heartbeat message 401 of FIG. 4.

In step 704, the node enterprise supervisor, receives a heartbeat response message from the configuration controller. For instance, the heartbeat response message may correspond to the package configuration message 405 of FIG. 4. The heartbeat response message includes second metadata indicative of whether the current configuration of the package is to be updated. Thereafter, the process moves to step 706, where responsive to the current configuration of the package requiring to be updated, the node enterprise supervisor, transmits a request message to a content delivery network (e.g., package content delivery network 241 of FIG. 2) of the cloud service to download the updated version of the package. It is appreciated that in case of requiring an update of the version of the package, the node enterprise supervisor, downloads the updated version from the content delivery network, whereas in case of requiring an update to the one or more configuration settings of the package, the node enterprise supervisor may obtain (in some implementations) the updated configuration settings in the heartbeat response message received from the configuration controller. The process then moves to step 708, where the node enterprise supervisor executes the downloaded version of the package and/or one or more updated configuration settings of the package in the node.

FIG. 8 illustrates a simplified flowchart 800 depicting steps performed by the cloud-based enterprise configuration controller (e.g., the configuration controller 245 of FIG. 2) according to certain implementations. The processing depicted in FIG. 8 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 8 and described below is intended to be illustrative and non-limiting. Although FIG. 8 depicts the various processing steps occurring in a particular sequence or order, this is not intended to be limiting. In certain alternative implementations, the steps may be performed in some different order or some steps may also be performed in parallel.

The process commences in step 802, where the configuration controller receives a heartbeat message from a node enterprise supervisor. The heartbeat message includes a first metadata indicative of a current configuration of a package that is being executed on a node. Note that the current configuration may include information pertaining to a version of the package and/or one or more configuration settings of the package that is executed on the node by the node enterprise supervisor.

The process then moves to step 804, where the configuration controller determines whether the current configuration of the package is to be updated. In some implementations, the configuration controller performs such a determination by comparing the first metadata included in the heartbeat message (transmitted from the node enterprise supervisor) to information (i.e., version and/or configuration settings) of a newer package that is published to a package content delivery network. Further, in step 806, in response to successfully determining that current configuration of the package (i.e., the version of the package and/or one or more configuration settings of the package) is to be updated, the configuration controller transmits a heartbeat response to the node enterprise supervisor. The heartbeat response message includes second metadata indicative of a new configuration of the package that is to be downloaded by the node enterprise supervisor. It is appreciated that the node enterprise supervisor upon receiving the heartbeat response message downloads the updated package from the content delivery network. Moreover, it is appreciated that in case the configuration controller determines that the current package is not required to be updated i.e., the version of the package and the one or more configuration settings of the package are up to date, then the configuration controller transmits the configuration response message to the node enterprise supervisor simply indicating that no updates are required.

FIG. 9 illustrates a simplified flowchart 900 depicting steps performed by a cloud-based enterprise service in updating one or more configuration parameters of a package on one or more nodes of a customer entries, according to certain implementations. In some implementations, the processing depicted in FIG. 9 may be implemented by the package service module 247 and the configuration controller 245 (i.e., components of the cloud-based enterprise service) depicted in FIG. 2. The processing depicted in FIG. 9 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 9 and described below is intended to be illustrative and non-limiting. Although FIG. 9 depicts the various processing steps occurring in a particular sequence or order, this is not intended to be limiting. In certain alternative implementations, the steps may be performed in some different order or some steps may also be performed in parallel.

The process commences in step 902, where the package service (deployed in a cloud environment) receives a request from a user interface (e.g., admin UI 207 of FIG. 2) to apply updated, one or more configuration settings to a package that is executed on one or more nodes in a customer enterprise. The process of FIG. 9 then moves to step 904, where the package service publishes the updated one or more configuration settings to the configuration controller. Thereafter, the process moves to step 906, where the configuration controller transmits, in response to receiving a heartbeat message from each of the one or more nodes, a heartbeat response message including the updated configuration settings. In some implementations, the cloud service may utilize a deployment orchestrator (e.g., deployment orchestrator 249 of FIG. 2) to update the configuration settings on the one or more nodes in an incremental fashion. Specifically, the deployment orchestrator may instruct the configuration controller to update the configuration setting on a first node and verify whether a heartbeat message transmitted from the first node is okay, before proceeding to update the configuration setting on subsequent node.

FIG. 10 illustrates a simplified flowchart 1000 depicting steps performed by a server/engine supervisor, according to certain implementations. The processing depicted in FIG. 10 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 10 and described below is intended to be illustrative and non-limiting. Although FIG. 10 depicts the various processing steps occurring in a particular sequence or order, this is not intended to be limiting. In certain alternative implementations, the steps may be performed in some different order or some steps may also be performed in parallel.

The process commences in step 1002, where a server supervisor e.g., server supervisor 304 of FIG. 3, transmits a heartbeat message to a configuration controller (e.g., configuration controller 345 of FIG. 3). The heartbeat message includes first metadata indicative of a current configuration of a server. It is noted that the current configuration may include information pertaining to a version of a package (executed on the server) and/or one or more configuration settings of the package.

In step 1004 of FIG. 10, the server supervisor receives a heartbeat response message from the configuration controller. For instance, the heartbeat response message may correspond to the package configuration message 405 of FIG. 4. The heartbeat response message includes second metadata indicative of whether the current configuration of the server is to be updated. Thereafter, the process of FIG. 10 moves to step 1006, where responsive to the current configuration of the server requiring to be updated, the server supervisor transmits a request message to a content delivery network (e.g., package content delivery network 341 of FIG. 3) of the cloud service 340 to download an updated configuration of the server (e.g., an updated version of the package executed on the server and/or updated configuration settings of the server). It is appreciated that in case of requiring an update of the version of the package, the server supervisor downloads the updated version from the content delivery network, whereas in case of requiring an update to the one or more configuration settings of the package, the server supervisor may obtain (in some implementations) the updated configuration settings in the heartbeat response message received from the configuration controller. The process then moves to step 1008, where the server supervisor executes the downloaded version of the package and/or one or more updated configuration settings on the server.

FIG. 11 illustrates another simplified flowchart 1100 depicting steps performed by the cloud-based enterprise configuration controller (e.g., the configuration controller 345 of FIG. 3) according to certain implementations. The processing depicted in FIG. 11 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 11 and described below is intended to be illustrative and non-limiting. Although FIG. 11 depicts the various processing steps occurring in a particular sequence or order, this is not intended to be limiting. In certain alternative implementations, the steps may be performed in some different order or some steps may also be performed in parallel.

The process commences in step 1102, where the configuration controller receives a heartbeat message from a server supervisor. The heartbeat message includes a first metadata indicative of a current configuration of a server. Note that the current configuration may include information pertaining to a version of a package (executed on the server) and/or one or more configuration settings of the package.

The process then moves to step 1104, where the configuration controller determines whether the current configuration of the server is to be updated. In some implementations, the configuration controller performs such a determination by comparing the first metadata included in the heartbeat message (transmitted from the server supervisor) to information (i.e., version and/or configuration settings) of a newer package that is published to a package content delivery network. Further, in step 1106, in response to successfully determining that current configuration of the server (e.g., the version of the package and/or one or more configuration settings) is to be updated, the configuration controller transmits a heartbeat response to the server supervisor. The heartbeat response message includes second metadata indicative of a new configuration of the server that is to be downloaded by the server supervisor. It is appreciated that the server supervisor upon receiving the heartbeat response message downloads an updated package from the content delivery network. Moreover, it is appreciated that in case the configuration controller determines that the current package is not required to be updated i.e., the version of the package and the one or more configuration settings of the package are up to date, then the configuration controller transmits the configuration response message to the server supervisor simply indicating that no updates are required.

FIG. 12 illustrates a simplified flowchart 1200 depicting steps performed by a server service deployed in a cloud environment according to certain implementations. Specifically, FIG. 12 illustrates a flowchart depicting the steps performed by a cloud-based enterprise service in updating one or more configuration settings of a server. In some implementations, the processing depicted in FIG. 12 may be implemented by the server configuration service 347 and the configuration controller 345 (i.e., components of the cloud-based enterprise service) depicted in FIG. 3. The processing depicted in FIG. 12 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 12 and described below is intended to be illustrative and non-limiting. Although FIG. 12 depicts the various processing steps occurring in a particular sequence or order, this is not intended to be limiting. In certain alternative implementations, the steps may be performed in some different order or some steps may also be performed in parallel.

The process commences in step 1202, where the server configuration service (deployed in the cloud environment) receives a request from a user interface (e.g., admin UI 307 of FIG. 3) to apply one or more updated configuration settings to a server(s) in a customer enterprise. The process of FIG. 12 then moves to step 1204, where the server configuration service publishes the updated one or more configuration settings to the configuration controller. Thereafter, the process moves to step 1206, where the configuration controller transmits, in response to receiving a heartbeat message from each of the one or more server supervisors (associated with the one or more servers), a heartbeat response message including the updated configuration settings. In some implementations, the cloud service may utilize a deployment orchestrator (e.g., deployment orchestrator 349 of FIG. 3) to update the configuration settings on the one or more servers in an incremental fashion. Specifically, the deployment orchestrator may instruct the configuration controller to update the configuration setting on a first server and verify whether a heartbeat message transmitted from the first node is okay, before proceeding to update the configuration setting on subsequent server. The deployment orchestrator may also be utilized to roll back the configuration settings of the server(s) to a prior configuration setting in case of failures encountered in the process of updating the configuration settings of the server(s).

Embodiments described above provide exemplary mechanisms for a customer enterprise deployment to be fully managed by a cloud services infrastructure. For example, FIG. 3 describes an exemplary architecture for deploying a single server (i.e., node) in the customer enterprise 301 and having a configuration controller (e.g., CBECC 345) included in the cloud services infrastructure 340 that manages deployment of packages on the server.

According to some embodiments, certain applications may require a capability of deploying a fleet of servers (i.e., a cluster of servers) in the customer enterprise 301. A naïve approach of creating the cluster of nodes includes utilizing a UI (e.g., UI 307 in FIG. 3) to create the nodes in an individual fashion. In such an approach, a service principal is set up for the node by a configuration component associated with the UI. Such an approach has several drawbacks. For instance, all nodes in the cluster share the same service principal, and moreover such an approach exposes a private key (e.g., in the UI) for different entities to access, thereby incurring security issues. Embodiments discussed below overcome the above stated drawbacks and provide for a cloud services infrastructure that is configured to process a single installation command that can deploy and manage the cluster of servers. Additionally, each server in the cluster of servers is assigned a unique identifier (i.e., node ID), as well as be associated with a unique service principal. In doing so, enables the cloud services infrastructure to monitor/track and audit requests issued from each server in the cluster of servers in a seamless manner. In what follows, there is described an exemplary framework for enabling the cloud services infrastructure to deploy and manage a cluster of servers, where each server is allocated a unique identifier as well as a service principal. Additionally, the framework for deploying the cluster of servers ensures that private keys generated by a particular server in the cluster of servers is not exposed to other servers or entities in the cloud services infrastructure.

Figure 13:
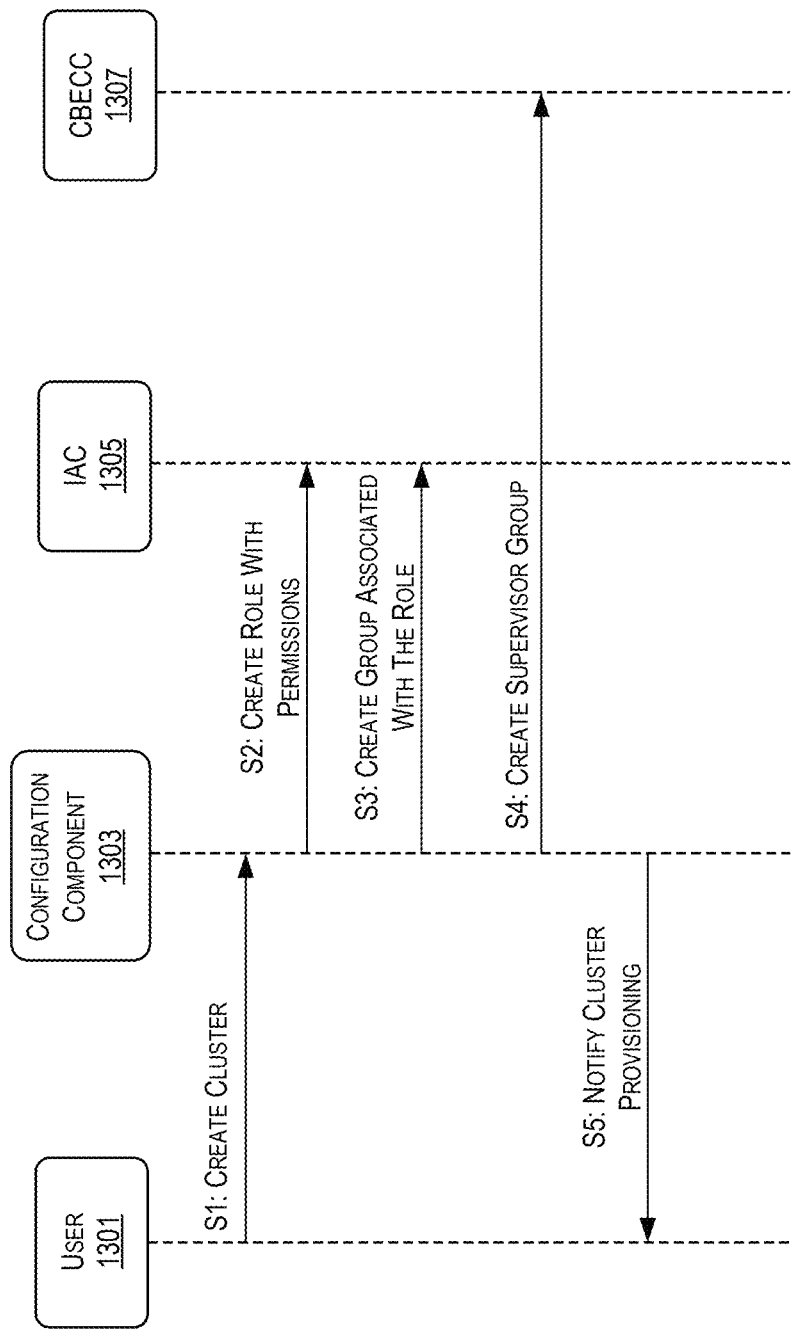
FIG. 13 depicts an exemplary swim diagram illustrating steps performed for creating a cluster of servers according to certain embodiments.

FIG. 13 depicts an exemplary swim diagram illustrating steps performed for creating a cluster of servers according to certain embodiments. Specifically, FIG. 13 illustrates interactions between a user 1301, a configuration component 1303, an identity access controller (IAC) 1305, and a cloud-based enterprise configuration controller 1307 (e.g., configuration controller 345 of FIG. 3). It is noted that user 1301 corresponds to a user of a customer (e.g., an administrator), whereas the configuration component 1303 may be a module included in configuration service of the cloud services infrastructure e.g., server configuration service 347 of FIG. 3. Further the IAC module 1305 may correspond to an entity of the cloud services infrastructure that is responsible for identity and access management related matters.

In step S1, the user 1301 may utilize an UI (e.g., admin UI 307 in FIG. 3) to issue a request for creating a cluster of servers. The issued request is directed to the configuration component 1303. In step S2, the configuration component 1303 requests the IAC module 1305 to create a role (associated with some predetermined permissions) for the cluster of servers. In step S3, the configuration component 1303 notifies the IAC module 1305 to assign a particular set of servers (i.e., create a group) that is to be associated with the role created in step S2.

In step S4, the configuration component 1303 transmits a request to the cloud-based enterprise configuration controller 1307. The request corresponds to the creation of a supervisor group that is to be associated with the cluster of servers. Note that as described previously, each server includes a server supervisor that is responsible for deploying packages on the server. The request in S4 may include an identifier (e.g., group name) for the cluster of servers, as well as a package that is to be deployed on the cluster of servers by the cloud-based enterprise configuration controller 1307.

In step S5, the configuration component 1303 notifies the user 1301 regarding the creation of the cluster of servers. In some implementations, the configuration component may notify the user with a plurality of attributes associated with the cluster of servers such as a tenancy information of the cluster of servers, a supervisor group identifier for the cluster of servers, and a token e.g., a boot-token or user's token, which is a short-lived token and used for creation of servers.

Figure 14:
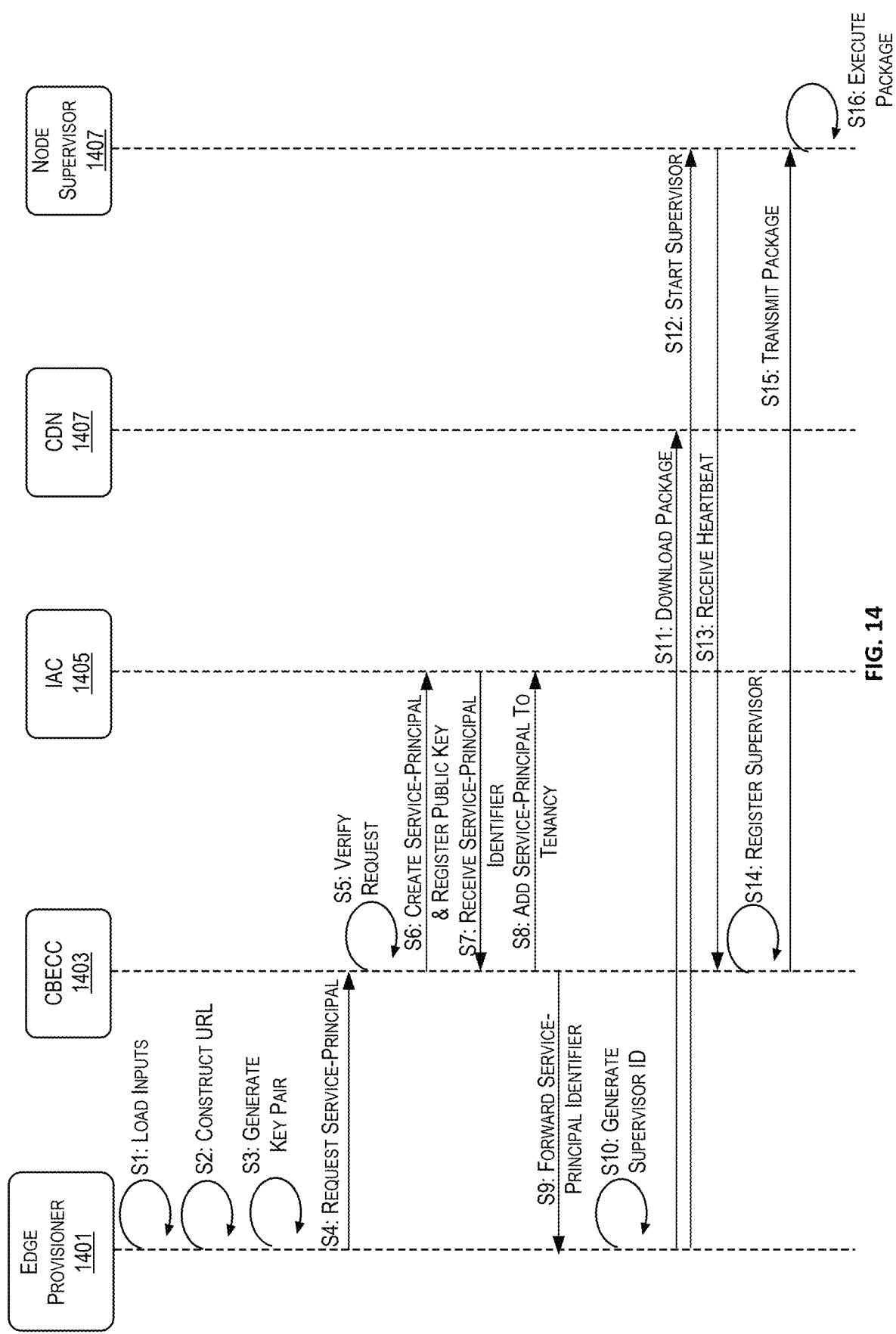
FIG. 14 depicts a swim diagram illustrating steps performed in provisioning a cluster of servers according to certain embodiments.

FIG. 14 depicts a swim diagram illustrating steps performed in provisioning a cluster of servers according to certain embodiments. The process depicted in FIG. 14 illustrates the provisioning process with respect to a single server. It is appreciated that the process may be replicated on each server included in the cluster of servers. FIG. 14 depicts interactions between an edge provisioner 1401, a cloud-based enterprise configuration controller 1403 (e.g., configuration controller 345 of FIG. 3), an IAC module 1405, a content delivery network (CDN) 1407 (e.g., CDN network 341 of FIG. 3) and a node supervisor 1407 (e.g., server supervisor 304 of FIG. 3). It is noted that the edge provisioner 1401 is a component that is installed in each node (i.e., server) included in the customer enterprise for purposes of performing the provisioning process as described below.

The process commences in step S1, where the edge provisioner 1401 loads one or more inputs including a token (e.g., boot-token associated with a user), tenancy information of the cluster of servers, a supervisor group ID. It is noted that the inputs are provided to the user in response to the user issuing a request to create the cluster of servers (e.g., in step S5 of FIG. 13). Upon loading the inputs, the edge provisioner 1401 in step S2, constructs a URL for the cloud-based enterprise configuration controller 1403 based on the tenancy information. In step S3, the edge provisioner 1401 generates a key pair including a private key and a public key.

In step S4, the edge provisioner 1401 transmits a request to the cloud-based enterprise configuration controller 1403, where the request corresponds to provisioning a service principal for the node (i.e., server). It is appreciated that the request may include the token (e.g., boot-token associated with a user), the supervisor group ID, and the public key that is generated in step S3.

The process then moves to step S5, where the cloud-based enterprise configuration controller 1403 validates the request (received from the edge provisioner 1401) based on verifying the supervisor group ID included in the request. Responsive to a successful validation, in step S6, the cloud-based enterprise configuration controller 1403 creates a service principal and registers the public key (received in the request) with the IAC module 1405. In step S7, the cloud-based enterprise configuration controller 1403 receives from the IAC module, an identifier for the service principal (denoted here as a service principal ID). In step S8, the cloud-based enterprise configuration controller 1403 associates the service principal (created in step S6) with a tenancy of the cluster of servers, and further forwards the service principal ID to the edge provisioner 1401 (step S9).

In step S10, the edge provisioner 1401 generates a supervisor ID (i.e., a identifier to be associated with a supervisor of the server, also referred to herein as a node identifier). In some implementations, the edge provisioner 1401 may generate the supervisor ID based on a combination of the service principal ID and the private key that is generated in S3. In this manner, a unique service principal and a unique supervisor ID is generated for each server in the cluster of servers. In step S11, the edge provisioner 1401 downloads a package to be installed on the node (i.e., server) from the CDN 1407 included in the cloud services infrastructure and instantiates the node supervisor 1407 (step S12).

In step S13, the cloud-based enterprise configuration controller 1403 receives a heartbeat message from the node supervisor 1407. It is noted that as described previously, upon instantiating the node supervisor in step S12, the node supervisor 1407 may transmit heartbeat messages in a periodic manner (i.e., at a predetermined transmission frequency e.g., once every couple of minutes). In response to receiving the heartbeat message, the cloud-based enterprise configuration controller 1403 registers the node supervisor in step S14, and further transmits a package that is to be installed on the node (i.e., server) in step S15. In turn, in step S16, the node supervisor 1407 executes the package received in step S15 from the cloud-based enterprise configuration controller 1403. Thus, embodiments of the present disclosure provide for a means to deploy a cluster of servers in a seamless manner, where each server included in the cluster of servers is assigned a unique service principal as well as a unique identifier (e.g., supervisor ID). Moreover, it is appreciated that the framework as described above for generating the cluster of servers is secure in that a private key (associated with a particular server) is never exchanged with other servers included in the cluster of servers.

Entities of various types, such as companies, educational institutions, medical facilities, governmental departments, and private individuals, among other examples, operate computing environments for various purposes. Computing environments, which can also be referred to as information technology environments, can include inter-networked, physical hardware devices, the software executing on the hardware devices, and the users of the hardware and software. As an example, an entity such as a school can operate a Local Area Network (LAN) that includes desktop computers, laptop computers, smart phones, and tablets connected to a physical and wireless network, where users correspond to teachers and students. In this example, the physical devices may be in buildings or a campus that is controlled by the school. As another example, an entity such as a business can operate a Wide Area Network (WAN) that includes physical devices in multiple geographic locations where the offices of the business are located. In this example, the different offices can be inter-networked using a combination of public networks such as the Internet and private networks. As another example, an entity can operate a data center at a centralized location, where computing resources (such as compute, memory, and/or networking resources) are kept and maintained, and whose resources are accessible over a network to users who may be in different geographical locations. In this example, users associated with the entity that operates the data center can access the computing resources in the data center over public and/or private networks that may not be operated and controlled by the same entity. Alternatively, or additionally, the operator of the data center may provide the computing resources to users associated with other entities, for example on a subscription basis. Such a data center operator may be referred to as a cloud services provider, and the services provided by such an entity may be described by one or more service models, such as a Software-as-a Service (SaaS) model, Infrastructure-as-a-Service (IaaS) model, or Platform-as-a-Service (PaaS), among others. In these examples, users may expect resources and/or services to be available on demand and without direct active management by the user, a resource delivery model often referred to as cloud computing.

Entities that operate computing environments need information about their computing environments. For example, an entity may need to know the operating status of the various computing resources in the entity's computing environment, so that the entity can administer the environment, including performing configuration and maintenance, performing repairs or replacements, provisioning additional resources, removing unused resources, or addressing issues that may arise during operation of the computing environment, among other examples. As another example, an entity can use information about a computing environment to identify and remediate security issues that may endanger the data, users, and/or equipment in the computing environment. As another example, an entity may be operating a computing environment for some purpose (e.g., to run an online store, to operate a bank, to manage a municipal railway, etc.) and may want information about the computing environment that can aid the entity in understanding whether the computing environment is operating efficiently and for its intended purpose.

Collection and analysis of the data from a computing environment can be performed by a data intake and query system such as is described herein. A data intake and query system can ingest, and store data obtained from the components in a computing environment, and can enable an entity to search, analyze, and visualize the data. Through these and other capabilities, the data intake and query system can enable an entity to use the data for administration of the computing environment, to detect security issues, to understand how the computing environment is performing or being used, and/or to perform other analytics.

Figure 15:
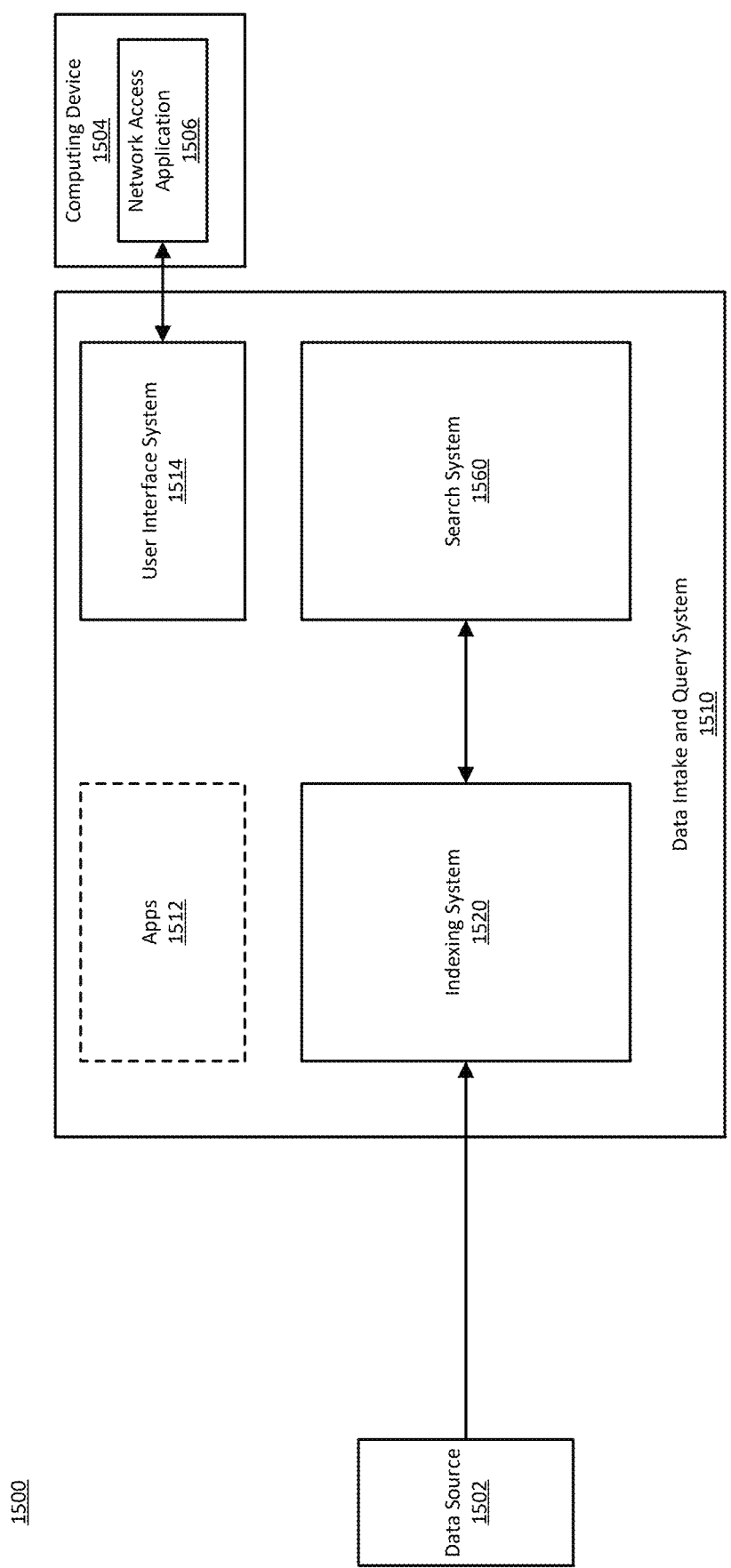
FIG. 15 is a block diagram illustrating an example computing environment that includes a data intake and query system.

FIG. 15 is a block diagram illustrating an example computing environment 1500 that includes a data intake and query system 1510. The data intake and query system 1510 obtains data from a data source 1502 in the computing environment 1500 and ingests the data using an indexing system 1520. A search system 1560 of the data intake and query system 1510 enables users to navigate the indexed data. Though drawn with separate boxes in FIG. #AA, in some implementations the indexing system 1520 and the search system 1560 can have overlapping components. A computing device 1504, running a network access application 1506, can communicate with the data intake and query system 1510 through a user interface system 1514 of the data intake and query system 1510. Using the computing device 1504, a user can perform various operations with respect to the data intake and query system 1510, such as administration of the data intake and query system 1510, management and generation of "knowledge objects," (user-defined entities for enriching data, such as saved searches, event types, tags, field extractions, lookups, reports, alerts, data models, workflow actions, and fields), initiating of searches, and generation of reports, among other operations. The data intake and query system 1510 can further optionally include apps 1512 that extend the search, analytics, and/or visualization capabilities of the data intake and query system 1510.

The data intake and query system 1510 can be implemented using program code that can be executed using a computing device. A computing device is an electronic device that has a memory for storing program code instructions and a hardware processor for executing the instructions. The computing device can further include other physical components, such as a network interface or components for input and output. The program code for the data intake and query system 1510 can be stored on a non-transitory computer-readable medium, such as a magnetic or optical storage disk or a flash or solid-state memory, from which the program code can be loaded into the memory of the computing device for execution. "Non-transitory" means that the computer-readable medium can retain the program code while not under power, as opposed to volatile or "transitory" memory or media that requires power in order to retain data.

In various examples, the program code for the data intake and query system 1510 can be executed on a single computing device, or execution of the program code can be distributed over multiple computing devices. For example, the program code can include instructions for both indexing and search components (which may be part of the indexing system 1520 and/or the search system 1560, respectively), which can be executed on a computing device that also provides the data source 1502. As another example, the program code can be executed on one computing device, where execution of the program code provides both indexing and search components, while another copy of the program code executes on a second computing device that provides the data source 1502. As another example, the program code can be configured such that, when executed, the program code implements only an indexing component or only a search component. In this example, a first instance of the program code that is executing the indexing component and a second instance of the program code that is executing the search component can be executing on the same computing device or on different computing devices.

The data source 1502 of the computing environment 1500 is a component of a computing device that produces machine data. The component can be a hardware component (e.g., a microprocessor or a network adapter, among other examples) or a software component (e.g., a part of the operating system or an application, among other examples). The component can be a virtual component, such as a virtual machine, a virtual machine monitor (also referred as a hypervisor), a container, or a container orchestrator, among other examples. Examples of computing devices that can provide the data source 1502 include personal computers (e.g., laptops, desktop computers, etc.), handheld devices (e.g., smart phones, tablet computers, etc.), servers (e.g., network servers, compute servers, storage servers, domain name servers, web servers, etc.), network infrastructure devices (e.g., routers, switches, firewalls, etc.), and "Internet of Things" devices (e.g., vehicles, home appliances, factory equipment, etc.), among other examples. Machine data is electronically generated data that is output by the component of the computing device and reflects activity of the component. Such activity can include, for example, operation status, actions performed, performance metrics, communications with other components, or communications with users, among other examples. The component can produce machine data in an automated fashion (e.g., through the ordinary course of being powered on and/or executing) and/or as a result of user interaction with the computing device (e.g., through the user's use of input/output devices or applications). The machine data can be structured, semi-structured, and/or unstructured. The machine data may be referred to as raw machine data when the data is unaltered from the format in which the data was output by the component of the computing device. Examples of machine data include operating system logs, web server logs, live application logs, network feeds, metrics, change monitoring, message queues, and archive files, among other examples.

As discussed in greater detail below, the indexing system 1520 obtains machine date from the data source 1502 and processes and stores the data. Processing and storing of data may be referred to as "ingestion" of the data. Processing of the data can include parsing the data to identify individual events, where an event is a discrete portion of machine data that can be associated with a timestamp. Processing of the data can further include generating an index of the events, where the index is a data storage structure in which the events are stored. The indexing system 1520 does not require prior knowledge of the structure of incoming data (e.g., the indexing system 1520 does not need to be provided with a schema describing the data). Additionally, the indexing system 1520 retains a copy of the data as it was received by the indexing system 1520 such that the original data is always available for searching (e.g., no data is discarded, though, in some examples, the indexing system 1520 can be configured to do so).

The search system 1560 searches the data stored by the indexing 1520 system. As discussed in greater detail below, the search system 1560 enables users associated with the computing environment 1500 (and possibly also other users) to navigate the data, generate reports, and visualize search results in "dashboards" output using a graphical interface. Using the facilities of the search system 1560, users can obtain insights about the data, such as retrieving events from an index, calculating metrics, searching for specific conditions within a rolling time window, identifying patterns in the data, and predicting future trends, among other examples. To achieve greater efficiency, the search system 1560 can apply map-reduce methods to parallelize searching of large volumes of data. Additionally, because the original data is available, the search system 1560 can apply a schema to the data at search time. This allows different structures to be applied to the same data, or for the structure to be modified if or when the content of the data changes. Application of a schema at search time may be referred to herein as a late-binding schema technique.

The user interface system 1514 provides mechanisms through which users associated with the computing environment 1500 (and possibly others) can interact with the data intake and query system 1510. These interactions can include configuration, administration, and management of the indexing system 1520, initiation and/or scheduling of queries that are to be processed by the search system 1560, receipt or reporting of search results, and/or visualization of search results. The user interface system 1514 can include, for example, facilities to provide a command line interface or a web-based interface.

Users can access the user interface system 1514 using a computing device 1504 that communicates with data intake and query system 1510, possibly over a network. A "user," in the context of the implementations and examples described herein, is a digital entity that is described by a set of information in a computing environment. The set of information can include, for example, a user identifier, a username, a password, a user account, a set of authentication credentials, a token, other data, and/or a combination of the preceding. Using the digital entity that is represented by a user, a person can interact with the computing environment 1500. For example, a person can log in as a particular user and, using the user's digital information, can access the data intake and query system 1510. A user can be associated with one or more people, meaning that one or more people may be able to use the same user's digital information. For example, an administrative user account may be used by multiple people who have been given access to the administrative user account. Alternatively, or additionally, a user can be associated with another digital entity, such as a bot (e.g., a software program that can perform autonomous tasks). A user can also be associated with one or more entities. For example, a company can have associated with it a number of users. In this example, the company may control the users' digital information, including assignment of user identifiers, management of security credentials, control of which persons are associated with which users, and so on.

The computing device 1504 can provide a human-machine interface through which a person can have a digital presence in the computing environment 1500 in the form of a user. The computing device 1504 is an electronic device having one or more processors and a memory capable of storing instructions for execution by the one or more processors. The computing device 1504 can further include input/output (I/O) hardware and a network interface. Applications executed by the computing device 1504 can include a network access application 1506, such as a web browser, which can use a network interface of the client computing device 1504 to communicate, over a network, with the user interface system 1514 of the data intake and query system 1510. The user interface system 1514 can use the network access application 1506 to generate user interfaces that enable a user to interact with the data intake and query system 1510. A web browser is one example of a network access application. A shell tool can also be used as a network access application. In some examples, the data intake and query system 1510 is an application executing on the computing device 1506. In such examples, the network access application 1506 can access the user interface system 1514 without going over a network.

The data intake and query system 1510 can optionally include apps 1512. An app of the data intake and query system 1510 is a collection of configurations, knowledge objects (a user-defined entity that enriches the data in the data intake and query system 1510), views, and dashboards that may provide additional functionality, different techniques for searching the data, and/or additional insights into the data. The data intake and query system 1510 can execute multiple applications simultaneously. Example applications include an information technology service intelligence application, which can monitor and analyze the performance and behavior of the computing environment 1500, and an enterprise security application, which can include content and searches to assist security analysts in diagnosing and acting on anomalous or malicious behavior in the computing environment 1500.

Though FIG. 15 illustrates only one data source, in practical implementations, the computing environment 1500 contains many data sources spread across numerous computing devices. The computing devices may be controlled and operated by a single entity. For example, in an "on the premises" or "on-prem" implementation, the computing devices may physically and digitally be controlled by one entity, meaning that the computing devices are in physical locations that are owned and/or operated by the entity and are within a network domain that is controlled by the entity. In an entirely on-prem implementation of the computing environment 1500, the data intake and query system 1510 executes on an on-prem computing device and obtains machine data from on-prem data sources. An on-prem implementation can also be referred to as an "enterprise" network, though the term "on-prem" refers primarily to physical locality of a network and who controls that location while the term "enterprise" may be used to refer to the network of a single entity. As such, an enterprise network could include cloud components.

"Cloud" or "in the cloud" refers to a network model in which an entity operates network resources (e.g., processor capacity, network capacity, storage capacity, etc.), located for example in a data center, and makes those resources available to users and/or other entities over a network. A "private cloud" is a cloud implementation where the entity provides the network resources only to its own users. A "public cloud" is a cloud implementation where an entity operates network resources in order to provide them to users that are not associated with the entity and/or to other entities. In this implementation, the provider entity can, for example, allow a subscriber entity to pay for a subscription that enables users associated with subscriber entity to access a certain amount of the provider entity's cloud resources, possibly for a limited time. A subscriber entity of cloud resources can also be referred to as a tenant of the provider entity. Users associated with the subscriber entity access the cloud resources over a network, which may include the public Internet. In contrast to an on-prem implementation, a subscriber entity does not have physical control of the computing devices that are in the cloud and has digital access to resources provided by the computing devices only to the extent that such access is enabled by the provider entity.

In some implementations, the computing environment 1500 can include on-prem and cloud-based computing resources, or only cloud-based resources. For example, an entity may have on-prem computing devices and a private cloud. In this example, the entity operates the data intake and query system 1510 and can choose to execute the data intake and query system 1510 on an on-prem computing device or in the cloud. In another example, a provider entity operates the data intake and query system 1510 in a public cloud and provides the functionality of the data intake and query system 1510 as a service, for example under a Software-as-a-Service (SaaS) model, to entities that pay for the user of the service on a subscription basis. In this example, the provider entity can provision a separate tenant (or possibly multiple tenants) in the public cloud network for each subscriber entity, where each tenant executes a separate and distinct instance of the data intake and query system 1510. In some implementations, the entity providing the data intake and query system 1510 is itself subscribing to the cloud services of a cloud service provider. As an example, a first entity provides computing resources under a public cloud service model, a second entity subscribes to the cloud services of the first provider entity and uses the cloud computing resources to operate the data intake and query system 1510, and a third entity can subscribe to the services of the second provider entity in order to use the functionality of the data intake and query system 1510. In this example, the data sources are associated with the third entity, users accessing the data intake and query system 1510 are associated with the third entity, and the analytics and insights provided by the data intake and query system 1510 are for purposes of the third entity's operations.

Figure 16:
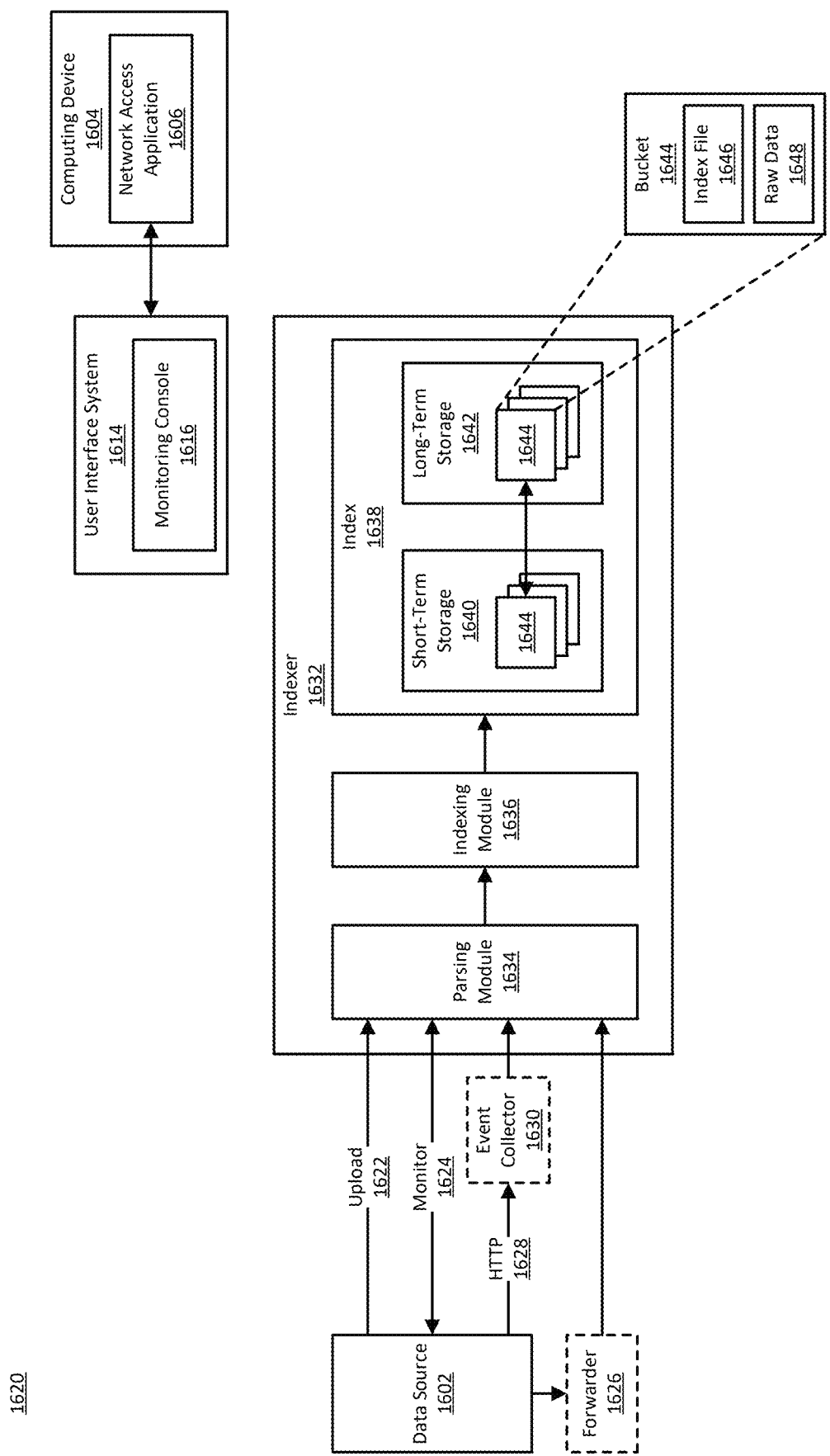
FIG. 16 is a block diagram illustrating an example of an indexing system included in the data intake and query system

FIG. 16 is a block diagram illustrating in greater detail an example of an indexing system 1620 of a data intake and query system, such as the data intake and query system 1510 of FIG. 15. The indexing system 1620 of FIG. 16 uses various methods to obtain machine data from a data source 1602 and stores the data in an index 1638 of an indexer 1632. As discussed previously, a data source is a hardware, software, physical, and/or virtual component of a computing device that produces machine data in an automated fashion and/or as a result of user interaction. Examples of data sources include files and directories; network event logs; operating system logs, operational data, and performance monitoring data; metrics; first-in, first-out queues; scripted inputs; and modular inputs, among others. The indexing system 1620 enables the data intake and query system to obtain the machine data produced by the data source 1602 and to store the data for searching and retrieval.

Users can administer the operations of the indexing system 1620 using a computing device 1604 that can access the indexing system 1620 through a user interface system 1614 of the data intake and query system. For example, the computing device 1604 can be executing a network access application 1606, such as a web browser or a terminal, through which a user can access a monitoring console 1616 provided by the user interface system 1614. The monitoring console 1616 can enable operations such as: identifying the data source 1602 for data ingestion; configuring the indexer 1632 to index the data from the data source 1632; configuring a data ingestion method; configuring, deploying, and managing clusters of indexers; and viewing the topology and performance of a deployment of the data intake and query system, among other operations. The operations performed by the indexing system 1620 may be referred to as "index time" operations, which are distinct from "search time" operations that are discussed further below.

The indexer 1632, which may be referred to herein as a data indexing component, coordinates and performs most of the index time operations. The indexer 1632 can be implemented using program code that can be executed on a computing device. The program code for the indexer 1632 can be stored on a non-transitory computer-readable medium (e.g., a magnetic, optical, or solid-state storage disk, a flash memory, or another type of non-transitory storage media), and from this medium can be loaded or copied to the memory of the computing device. One or more hardware processors of the computing device can read the program code from the memory and execute the program code in order to implement the operations of the indexer 1632. In some implementations, the indexer 1632 executes on the computing device 1604 through which a user can access the indexing system 1620. In some implementations, the indexer 1632 executes on a different computing device than the illustrated computing device 1604.

The indexer 1632 may be executing on the computing device that also provides the data source 1602 or may be executing on a different computing device. In implementations wherein the indexer 1632 is on the same computing device as the data source 1602, the data produced by the data source 1602 may be referred to as "local data." In other implementations the data source 1602 is a component of a first computing device and the indexer 1632 executes on a second computing device that is different from the first computing device. In these implementations, the data produced by the data source 1602 may be referred to as "remote data." In some implementations, the first computing device is "on-prem" and in some implementations the first computing device is "in the cloud." In some implementations, the indexer 1632 executes on a computing device in the cloud and the operations of the indexer 1632 are provided as a service to entities that subscribe to the services provided by the data intake and query system.

For a given data produced by the data source 1602, the indexing system 1620 can be configured to use one of several methods to ingest the data into the indexer 1632. These methods include upload 1622, monitor 1624, using a forwarder 1626, or using Hypertext Transfer Protocol (HTTP 1628) and an event collector 1630. These and other methods for data ingestion may be referred to as "getting data in" (GDI) methods.

Using the upload 1622 method, a user can specify a file for uploading into the indexer 1632. For example, the monitoring console 1616 can include commands or an interface through which the user can specify where the file is located (e.g., on which computing device and/or in which directory of a file system) and the name of the file. The file may be located at the data source 1602 or maybe on the computing device where the indexer 1632 is executing. Once uploading is initiated, the indexer 1632 processes the file, as discussed further below. Uploading is a manual process and occurs when instigated by a user. For automated data ingestion, the other ingestion methods are used.

The monitor 1624 method enables the indexing system 1602 to monitor the data source 1602 and continuously or periodically obtain data produced by the data source 1602 for ingestion by the indexer 1632. For example, using the monitoring console 1616, a user can specify a file or directory for monitoring. In this example, the indexing system 1602 can execute a monitoring process that detects whenever the file or directory is modified and causes the file or directory contents to be sent to the indexer 1632. As another example, a user can specify a network port for monitoring. In this example, a monitoring process can capture data received at or transmitting from the network port and cause the data to be sent to the indexer 1632. In various examples, monitoring can also be configured for data sources such as operating system event logs, performance data generated by an operating system, operating system registries, operating system directory services, and other data sources.

Monitoring is available when the data source 1602 is local to the indexer 1632 (e.g., the data source 1602 is on the computing device where the indexer 1632 is executing). Other data ingestion methods, including forwarding and the event collector 1630, can be used for either local or remote data sources.

A forwarder 1626, which may be referred to herein as a data forwarding component, is a software process that sends data from the data source 1602 to the indexer 1632. The forwarder 1626 can be implemented using program code that can be executed on the computer device that provides the data source 1602. A user launches the program code for the forwarder 1626 on the computing device that provides the data source 1602. The user can further configure the forwarder 1626, for example to specify a receiver for the data being forwarded (e.g., one or more indexers, another forwarder, and/or another recipient system), to enable or disable data forwarding, and to specify a file, directory, network events, operating system data, or other data to forward, among other operations.

The forwarder 1626 can provide various capabilities. For example, the forwarder 1626 can send the data unprocessed or can perform minimal processing on the data before sending the data to the indexer 1632. Minimal processing can include, for example, adding metadata tags to the data to identify a source, source type, and/or host, among other information, dividing the data into blocks, and/or applying a timestamp to the data. In some implementations, the forwarder 1626 can break the data into individual events (event generation is discussed further below) and send the events to a receiver. Other operations that the forwarder 1626 may be configured to perform include buffering data, compressing data, and using secure protocols for sending the data, for example.

Forwarders can be configured in various topologies. For example, multiple forwarders can send data to the same indexer. As another example, a forwarder can be configured to filter and/or route events to specific receivers (e.g., different indexers), and/or discard events. As another example, a forwarder can be configured to send data to another forwarder, or to a receiver that is not an indexer or a forwarder (such as, for example, a log aggregator).

The event collector 1630 provides an alternate method for obtaining data from the data source 1602. The event collector 1630 enables data and application events to be sent to the indexer 1632 using HTTP 1628. The event collector 1630 can be implemented using program code that can be executing on a computing device. The program code may be a component of the data intake and query system or can be a standalone component that can be executed independently of the data intake and query system and operates in cooperation with the data intake and query system.

To use the event collector 1630, a user can, for example using the monitoring console 1616 or a similar interface provided by the user interface system 1614, enable the event collector 1630 and configure an authentication token. In this context, an authentication token is a piece of digital data generated by a computing device, such as a server, which contains information to identify a particular entity, such as a user or a computing device, to the server. The token will contain identification information for the entity (e.g., an alphanumeric string that is unique to each token) and a code that authenticates the entity with the server. The token can be used, for example, by the data source 1602 as an alternative method to using a username and password for authentication.

To send data to the event collector 1630, the data source 1602 is supplied with a token and can then send HTTP 1628 requests to the event collector 1630. To send HTTP 1628 requests, the data source 1602 can be configured to use an HTTP client and/or to use logging libraries such as those supplied by Java, JavaScript, and NET libraries. An HTTP client enables the data source 1602 to send data to the event collector 1630 by supplying the data, and a Uniform Resource Identifier (URI) for the event collector 1630 to the HTTP client. The HTTP client then handles establishing a connection with the event collector 1630, transmitting a request containing the data, closing the connection, and receiving an acknowledgment if the event collector 1630 sends one. Logging libraries enable HTTP 1628 requests to the event collector 1630 to be generated directly by the data source. For example, an application can include or link a logging library, and through functionality provided by the logging library manage establishing a connection with the event collector 1630, transmitting a request, and receiving an acknowledgement.

An HTTP 1628 request to the event collector 1630 can contain a token, a channel identifier, event metadata, and/or event data. The token authenticates the request with the event collector 1630. The channel identifier, if available in the indexing system 1620, enables the event collector 1630 to segregate and keep separate data from different data sources. The event metadata can include one or more key-value pairs that describe the data source 1602 or the event data included in the request. For example, the event metadata can include key-value pairs specifying a timestamp, a hostname, a source, a source type, or an index where the event data should be indexed. The event data can be a structured data object, such as a JavaScript Object Notation (JSON) object, or raw text. The structured data object can include both event data and event metadata. Additionally, one request can include event data for one or more events.

In some implementations, the event collector 1630 extracts events from HTTP 1628 requests and sends the events to the indexer 1632. The event collector 1630 can further be configured to send events to one or more indexers. Extracting the events can include associating any metadata in a request with the event or events included in the request. In these implementations, event generation by the indexer 1632 (discussed further below) is bypassed, and the indexer 1632 moves the events directly to indexing. In some implementations, the event collector 1630 extracts event data from a request and outputs the event data to the indexer 1632, and the indexer generates events from the event data. In some implementations, the event collector 1630 sends an acknowledgement message to the data source 1602 to indicate that the event collector 1630 has received a particular request form the data source 1602, and/or to indicate to the data source 1602 that events in the request have been added to an index.

The indexer 1632 ingests incoming data and transforms the data into searchable knowledge in the form of events. In the data intake and query system, an event is a single piece of data that represents activity of the component represented in FIG. 16 by the data source 1602. An event can be, for example, a single record in a log file that records a single action performed by the component (e.g., a user login, a disk read, transmission of a network packet, etc.). An event includes one or more fields that together describe the action captured by the event, where a field is a key-value pair (also referred to as a name-value pair). In some cases, an event includes both the key and the value, and in some cases the event includes only the value, and the key can be inferred or assumed.

Transformation of data into events can include event generation and event indexing. Event generation includes identifying each discrete piece of data that represents one event and associating each event with a timestamp and possibly other information (which may be referred to herein as metadata). Event indexing includes storing of each event in the data structure of an index. As an example, the indexer 1632 can include a parsing module 1634 and an indexing module 1636 for generating and storing the events. The parsing module 1634 and indexing module 1636 can be modular and pipelined, such that one component can be operating on a first set of data while the second component is simultaneously operating on a second sent of data. Additionally, the indexer 1632 may at any time have multiple instances of the parsing module 1634 and indexing module 1636, with each set of instances configured to simultaneously operate on data from the same data source or from different data sources. The parsing module 1634 and indexing module 1636 are illustrated in FIG. 16 to facilitate discussion, with the understanding that implementations with other components are possible to achieve the same functionality.

The parsing module 1634 determines information about incoming event data, where the information can be used to identify events within the event data. For example, the parsing module 1634 can associate a source type with the event data. A source type identifies the data source 1602 and describes a possible data structure of event data produced by the data source 1602. For example, the source type can indicate which fields to expect in events generated at the data source 1602 and the keys for the values in the fields, and possibly other information such as sizes of fields, an order of the fields, a field separator, and so on. The source type of the data source 1602 can be specified when the data source 1602 is configured as a source of event data. Alternatively, the parsing module 1634 can determine the source type from the event data, for example from an event field in the event data or using machine learning techniques applied to the event data.

Other information that the parsing module 1634 can determine includes timestamps. In some cases, an event includes a timestamp as a field, and the timestamp indicates a point in time when the action represented by the event occurred or was recorded by the data source 1602 as event data. In these cases, the parsing module 1634 may be able to determine from the source type associated with the event data that the timestamps can be extracted from the events themselves. In some cases, an event does not include a timestamp and the parsing module 1634 determines a timestamp for the event, for example from a name associated with the event data from the data source 1602 (e.g., a file name when the event data is in the form of a file) or a time associated with the event data (e.g., a file modification time).

As another example, when the parsing module 1634 is not able to determine a timestamp from the event data, the parsing module 1634 may use the time at which it is indexing the event data. As another example, the parsing module 1634 can use a user-configured rule to determine the timestamps to associate with events.

The parsing module 1634 can further determine event boundaries. In some cases, a single line (e.g., a sequence of characters ending with a line termination) in event data represents one event while in other cases, a single line represents multiple events. In yet other cases, one event may span multiple lines within the event data. The parsing module 1634 may be able to determine event boundaries from the source type associated with the event data, for example from a data structure indicated by the source type. In some implementations, a user can configure rules the parsing module 1634 can use to identify event boundaries.

The parsing module 1634 can further extract data from events and possibly also perform transformations on the events. For example, the parsing module 1634 can extract a set of fields (key-value pairs) for each event, such as a host or hostname, source or source name, and/or source type. The parsing module 1634 may extract certain fields by default or based on a user configuration. Alternatively, or additionally, the parsing module 1634 may add fields to events, such as a source type or a user-configured field. As another example of a transformation, the parsing module 1634 can anonymize fields in events to mask sensitive information, such as social security numbers or account numbers. Anonymizing fields can include changing or replacing values of specific fields. The parsing component 1634 can further perform user-configured transformations.

The parsing module 1634 outputs the results of processing incoming event data to the indexing module 1636, which performs event segmentation and builds index data structures.

Event segmentation identifies searchable segments, which may alternatively be referred to as searchable terms or keywords, which can be used by the search system of the data intake and query system to search the event data. A searchable segment may be a part of a field in an event or an entire field. The indexer 1632 can be configured to identify searchable segments that are parts of fields, searchable segments that are entire fields, or both. The parsing module 1634 organizes the searchable segments into a lexicon or dictionary for the event data, with the lexicon including each searchable segment (e.g., the field "src=10.10.1.1") and a reference to the location of each occurrence of the searchable segment within the event data (e.g., the location within the event data of each occurrence of "src=10.10.1.1"). As discussed further below, the search system can use the lexicon, which is stored in an index file 1646, to find event data that matches a search query. In some implementations, segmentation can alternatively be performed by the forwarder 1626. Segmentation can also be disabled, in which case the indexer 1632 will not build a lexicon for the event data. When segmentation is disabled, the search system searches the event data directly.

Building index data structures generates the index 1638. The index 1638 is a storage data structure on a storage device (e.g., a disk drive or other physical device for storing digital data). The storage device may be a component of the computing device on which the indexer 1632 is operating (referred to herein as local storage) or may be a component of a different computing device (referred to herein as remote storage) that the indexer 1638 has access to over a network. The indexer 1632 can manage more than one index and can manage indexes of different types. For example, the indexer 1632 can manage event indexes, which impose minimal structure on stored data and can accommodate any type of data. As another example, the indexer 1632 can manage metrics indexes, which use a highly structured format to handle the higher volume and lower latency demands associated with metrics data.

The indexing module 1636 organizes files in the index 1638 in directories referred to as buckets. The files in a bucket 1644 can include raw data files, index files, and possibly also other metadata files. As used herein, "raw data" means data as when the data was produced by the data source 1602, without alteration to the format or content. As noted previously, the parsing component 1634 may add fields to event data and/or perform transformations on fields in the event data. Event data that has been altered in this way is referred to herein as enriched data. A raw data file 1648 can include enriched data, in addition to or instead of raw data. The raw data file 1648 may be compressed to reduce disk usage. An index file 1646, which may also be referred to herein as a "time-series index" or tsidx file, contains metadata that the indexer 1632 can use to search a corresponding raw data file 1648. As noted above, the metadata in the index file 1646 includes a lexicon of the event data, which associates each unique keyword in the event data with a reference to the location of event data within the raw data file 1648. The keyword data in the index file 1646 may also be referred to as an inverted index. In various implementations, the data intake and query system can use index files for other purposes, such as to store data summarizations that can be used to accelerate searches.

A bucket 1644 includes event data for a particular range of time. The indexing module 1636 arranges buckets in the index 1638 according to the age of the buckets, such that buckets for more recent ranges of time are stored in short-term storage 1640 and buckets for less recent ranges of time are stored in long-term storage 1642. Short-term storage 1640 may be faster to access while long-term storage 1642 may be slower to access. Buckets may be moves from short-term storage 1640 to long-term storage 1642 according to a configurable data retention policy, which can indicate at what point in time a bucket is old enough to be moved.

A bucket's location in short-term storage 1640 or long-term storage 1642 can also be indicated by the bucket's status. As an example, a bucket's status can be "hot," "warm," "cold," "frozen," or "thawed." In this example, hot bucket is one to which the indexer 1632 is writing data and the bucket becomes a warm bucket when the index 1632 stops writing data to it. In this example, both hot and warm buckets reside in short-term storage 1640. Continuing this example, when a warm bucket is moved to long-term storage 1642, the bucket becomes a cold bucket. A cold bucket can become a frozen bucket after a period of time, at which point the bucket may be deleted or archived. An archived bucket cannot be searched. When an archived bucket is retrieved for searching, the bucket becomes thawed and can then be searched.

The indexing system 1620 can include more than one indexer, where a group of indexers is referred to as an index cluster. The indexers in an index cluster may also be referred to as peer nodes. In an index cluster, the indexers are configured to replicate each other's data by copying buckets from one indexer to another. The number of copies of a bucket can be configured (e.g., three copies of each buckets must exist within the cluster), and indexers to which buckets are copied may be selected to optimize distribution of data across the cluster.

A user can view the performance of the indexing system 1620 through the monitoring console 1616 provided by the user interface system 1614. Using the monitoring console 1616, the user can configure and monitor an index cluster, and see information such as disk usage by an index, volume usage by an indexer, index and volume size over time, data age, statistics for bucket types, and bucket settings, among other information.

Figure 17:
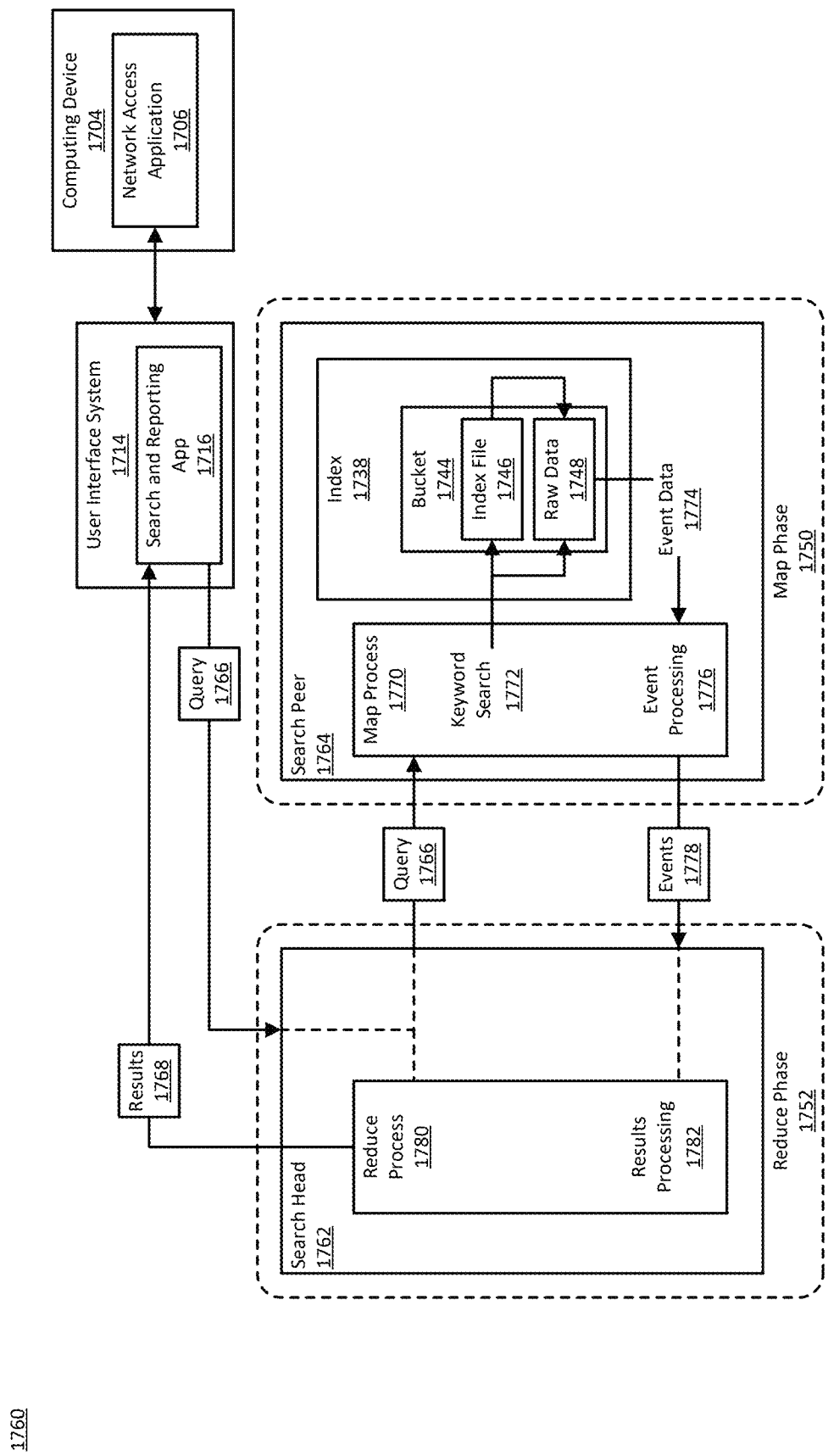
FIG. 17 is a block diagram illustrating an example of a search system included in the data intake and query system.

FIG. 17 is a block diagram illustrating in greater detail an example of the search system 1760 of a data intake and query system, such as the data intake and query system 1510 of FIG. #AA. The search system 1760 of FIG. 17 issues a query 1766 to a search head 1762, which sends the query 1766 to a search peer 1764. Using a map process 1770, the search peer 1764 searches the appropriate index 1738 for events identified by the query 1766 and sends events 1778 so identified back to the search head 1762. Using a reduce process 1782, the search head 1762 processes the events 1778 and produces results 1768 to respond to the query 1766. The results 1768 can provide useful insights about the data stored in the index 1738. These insights can aid in the administration of information technology systems, in security analysis of information technology systems, and/or in analysis of the development environment provided by information technology systems.

The query 1766 that initiates a search is produced by a search and reporting app 1716 that is available through the user interface system 1714 of the data intake and query system. Using a network access application 1706 executing on a computing device 1704, a user can input the query 1766 into a search field provided by the search and reporting app 1716. Alternatively, or additionally, the search and reporting app 1716 can include pre-configured queries or stored queries that can be activated by the user. In some cases, the search and reporting app 1716 initiates the query 1766 when the user enters the query 1766. In these cases, the query 1766 maybe referred to as an "ad-hoc" query. In some cases, the search and reporting app 1716 initiates the query 1766 based on a schedule. For example, the search and reporting app 1716 can be configured to execute the query 1766 once per hour, once per day, at a specific time, on a specific date, or at some other time that can be specified by a date, time, and/or frequency. These types of queries maybe referred to as scheduled queries.

The query 1766 is specified using a search processing language. The search processing language includes commands or search terms that the search peer 1764 will use to identify events to return in the search results 1768. The search processing language can further include commands for filtering events, extracting more information from events, evaluating fields in events, aggregating events, calculating statistics over events, organizing the results, and/or generating charts, graphs, or other visualizations, among other examples. Some search commands may have functions and arguments associated with them, which can, for example, specify how the commands operate on results and which fields to act upon. The search processing language may further include constructs that enable the query 1766 to include sequential commands, where a subsequent command may operate on the results of a prior command. As an example, sequential commands may be separated in the query 1766 by a vertical line ("I" or "pipe") symbol.

In addition to one or more search commands, the query 1766 includes a time indicator. The time indicator limits searching to events that have timestamps described by the indicator. For example, the time indicator can indicate a specific point in time (e.g., 10:00:00 am today), in which case only events that have the point in time for their timestamp will be searched. As another example, the time indicator can indicate a range of time (e.g., the last 24 hours), in which case only events whose timestamps fall within the range of time will be searched. The time indicator can alternatively indicate all of time, in which case all events will be searched.

Processing of the search query 1766 occurs in two broad phases: a map phase 1750 and a reduce phase 1752. The map phase 1750 takes place across one or more search peers. In the map phase 1750, the search peers locate event data that matches the search terms in the search query 1766 and sorts the event data into field-value pairs. When the map phase 1750 is complete, the search peers send events that they have found to one or more search heads for the reduce phase 1752. During the reduce phase 1752, the search heads process the events through commands in the search query 1766 and aggregate the events to produce the final search results 1768.

A search head, such as the search head 1762 illustrated in FIG. 17, is a component of the search system 1760 that manages searches. The search head 1762, which may also be referred to herein as a search management component, can be implemented using program code that can be executed on a computing device. The program code for the search head 1762 can be stored on a non-transitory computer-readable medium and from this medium can be loaded or copied to the memory of a computing device. One or more hardware processors of the computing device can read the program code from the memory and execute the program code in order to implement the operations of the search head 1762.

Upon receiving the search query 1766, the search head 1762 directs the query 1766 to one or more search peers, such as the search peer 1764 illustrated in FIG. 17. "Search peer" is an alternate name for "indexer" and a search peer may be largely similar to the indexer described previously. The search peer 1764 may be referred to as a "peer node" when the search peer 1764 is part of an indexer cluster. The search peer 1764, which may also be referred to as a search execution component, can be implemented using program code that can be executed on a computing device. In some implementations, one set of program code implements both the search head 1762 and the search peer 1764 such that the search head 1762 and the search peer 1764 form one component. In some implementations, the search head 1762 is an independent piece of code that performs searching and no indexing functionality. In these implementations, the search head 1762 may be referred to as a dedicated search head.

The search head 1762 may consider multiple criteria when determining whether to send the query 1766 to the particular search peer 1764. For example, the search system 1760 may be configured to include multiple search peers that each have duplicative copies of at least some of the event data and are implanted using different hardware resources q. In this example, the sending the search query 1766 to more than one search peer allows the search system 1760 to distribute the search workload across different hardware resources. As another example, search system 1760 may include different search peers for different purposes (e.g., one has an index storing a first type of data or from a first data source while a second has an index storing a second type of data or from a second data source). In this example, the search query 1766 may specify which indexes to search, and the search head 1762 will send the query 1766 to the search peers that have those indexes.

To identify events 1778 to send back to the search head 1762, the search peer 1764 performs a map process 1770 to obtain event data 1774 from the index 1738 that is maintained by the search peer 1764. During a first phase of the map process 1770, the search peer 1764 identifies buckets that have events that are described by the time indicator in the search query 1766. As noted above, a bucket contains events whose timestamps fall within a particular range of time. For each bucket 1744 whose events can be described by the time indicator, during a second phase of the map process 1770, the search peer 1764 performs a keyword search 1774 using search terms specified in the search query 1766. The search terms can be one or more of keywords, phrases, fields, Boolean expressions, and/or comparison expressions that in combination describe events being searched for. When segmentation is enabled at index time, the search peer 1764 performs the keyword search 1772 on the bucket's index file 1746. As noted previously, the index file 1746 includes a lexicon of the searchable terms in the events stored in the bucket's raw data 1748 file. The keyword search 1772 searches the lexicon for searchable terms that correspond to one or more of the search terms in the query 1766. As also noted above, the lexicon incudes, for each searchable term, a reference to each location in the raw data 1748 file where the searchable term can be found. Thus, when the keyword search identifies a searchable term in the index file 1746 that matches a search term in the query 1766, the search peer 1764 can use the location references to extract from the raw data 1748 file the event data 1774 for each event that include the searchable term.

In cases where segmentation was disabled at index time, the search peer 1764 performs the keyword search 1772 directly on the raw data 1748 file. To search the raw data 1748, the search peer 1764 may identify searchable segments in events in a similar manner as when the data was indexed. Thus, depending on how the search peer 1764 is configured, the search peer 1764 may look at event fields and/or parts of event fields to determine whether an event matches the query 1766. Any matching events can be added to the event data 1774 read from the raw data 1748 file. The search peer 1764 can further be configured to enable segmentation at search time, so that searching of the index 1738 causes the search peer 1764 to build a lexicon in the index file 1746.

The event data 1774 obtained from the raw data 1748 file includes the full text of each event found by the keyword search 1772. During a third phase of the map process 1770, the search peer 1764 performs event processing 1776 on the event data 1774, with the steps performed being determined by the configuration of the search peer 1764 and/or commands in the search query 1766. For example, the search peer 1764 can be configured to perform field discovery and field extraction. Field discovery is a process by which the search peer 1764 identifies and extracts key-value pairs from the events in the event data 1774. The search peer 1764 can, for example, be configured to automatically extract the first 100 fields (or another number of fields) in the event data 1774 that can be identified as key-value pairs. As another example, the search peer 1764 can extract any fields explicitly mentioned in the search query 1766. The search peer 1764 can, alternatively or additionally, be configured with particular field extractions to perform.

Other examples of steps that can be performed during event processing 1776 include: field aliasing (assigning an alternate name to a field); addition of fields from lookups (adding fields from an external source to events based on existing field values in the events); associating event types with events; source type renaming (changing the name of the source type associated with particular events); and tagging (adding one or more strings of text, or a "tags" to particular events), among other examples.

The search peer 1764 sends processed events 1778 to the search head 1762, which performs a reduce process 1780. The reduce process 1780 potentially receives events from multiple search peers and performs various results processing 1782 steps on the received events. The results processing 1782 steps can include, for example, aggregating the events received from different search peers into a single set of events, de-duplicating and aggregating fields discovered by different search peers, counting the number of events found, and sorting the events by timestamp (e.g., newest first or oldest first), among other examples. Results processing 1782 can further include applying commands from the search query 1766 to the events. The query 1766 can include, for example, commands for evaluating and/or manipulating fields (e.g., to generate new fields from existing fields or parse fields that have more than one value). As another example, the query 1766 can include commands for calculating statistics over the events, such as counts of the occurrences of fields, or sums, averages, ranges, and so on, of field values. As another example, the query 1766 can include commands for generating statistical values for purposes of generating charts of graphs of the events.

The reduce process 1780 outputs the events found by the search query 1766, as well as information about the events. The search head 1762 transmits the events and the information about the events as search results 1768, which are received by the search and reporting app 1716. The search and reporting app 1716 can generate visual interfaces for viewing the search results 1768. The search and reporting app 1716 can, for example, output visual interfaces for the network access application 1706 running on a computing device 1704 to generate.

The visual interfaces can include various visualizations of the search results 1768, such as tables, line or area charts, Chloropleth maps, or single values. The search and reporting app 1716 can organize the visualizations into a dashboard, where the dashboard includes a panel for each visualization. A dashboard can thus include, for example, a panel listing the raw event data for the events in the search results 1768, a panel listing fields extracted at index time and/or found through field discovery along with statistics for those fields, and/or a timeline chart indicating how many events occurred at specific points in time (as indicated by the timestamps associated with each event). In various implementations, the search and reporting app 1716 can provide one or more default dashboards. Alternatively, or additionally, the search and reporting app 1716 can include functionality that enables a user to configure custom dashboards.

The search and reporting app 1716 can also enable further investigation into the events in the search results 1716. The process of further investigation may be referred to as drilldown. For example, a visualization in a dashboard can include interactive elements, which, when selected, provide options for finding out more about the data being displayed by the interactive elements. To find out more, an interactive element can, for example, generate a new search that includes some of the data being displayed by the interactive element, and thus may be more focused than the initial search query 1766. As another example, an interactive element can launch a different dashboard whose panels include more detailed information about the data that is displayed by the interactive element. Other examples of actions that can be performed by interactive elements in a dashboard include opening a link, playing an audio or video file, or launching another application, among other examples.

Figure 18:
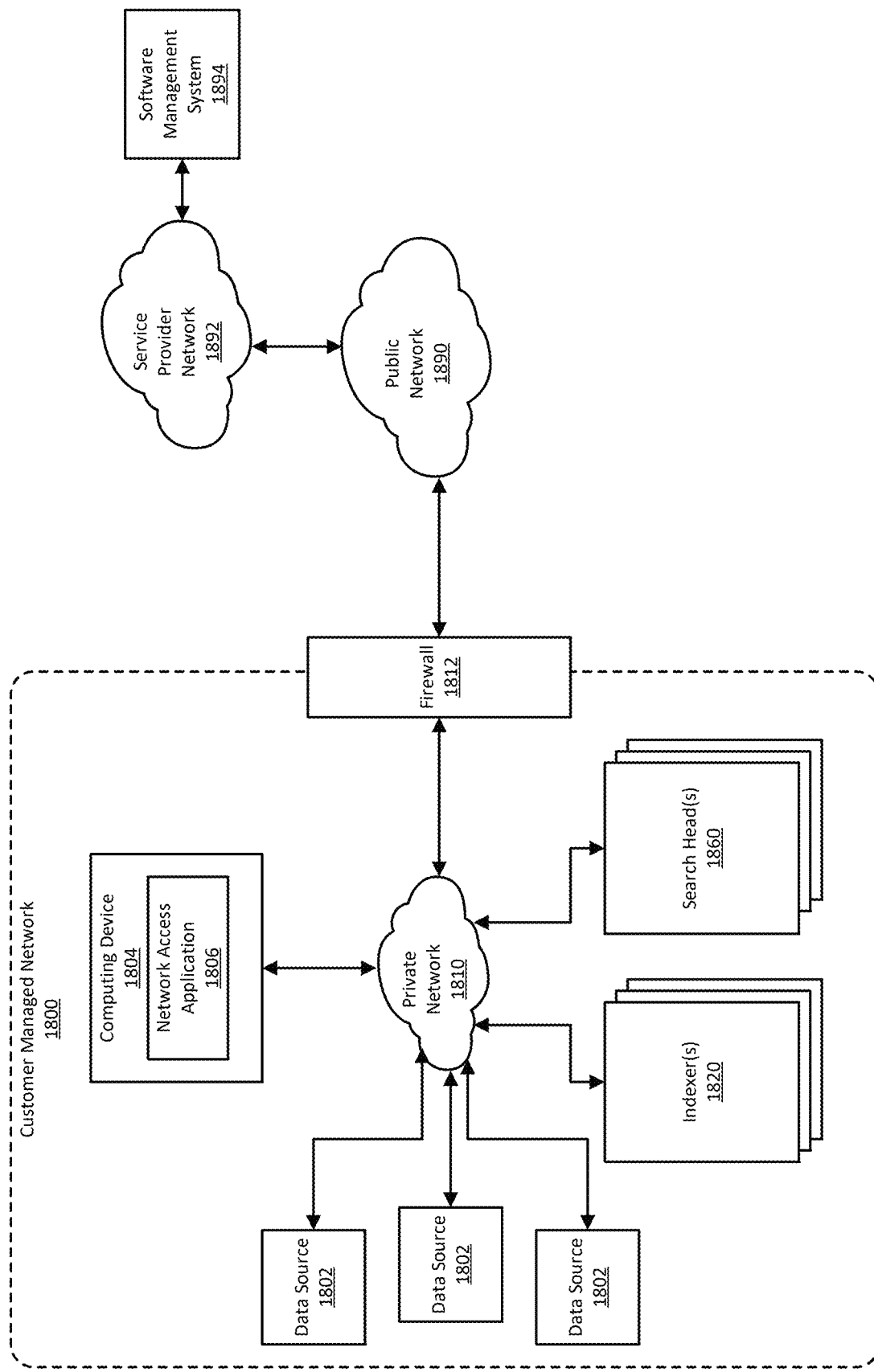
FIG. 18 illustrates an example of a customer managed network.

FIG. 18 illustrates an example of a self-managed network 1800 that includes a data intake and query system. "Self-managed" in this instance means that the entity that is operating the self-managed network 1800 configures, administers, maintains, and/or operates the data intake and query system using its own compute resources and people. Further, the self-managed network 1800 of this example is part of the entity's on-premise network and comprises a set of compute, memory, and networking resources that are located, for example, within the confines of an entity's data center. These resources can include software and hardware resources. The entity can, for example, be a company or enterprise, a school, government entity, or other entity. Since the self-managed network 1800 is located within the customer's on-prem environment, such as in the entity's data center, the operation and management of the self-managed network 1800, including of the resources in the self-managed network 1800, is under the control of the entity. For example, administrative personnel of the entity have complete access to and control over the configuration, management, and security of the self-managed network 1800 and its resources.

The self-managed network 1800 can execute one or more instances of the data intake and query system. An instance of the data intake and query system may be executed by one or more computing devices that are part of the self-managed network 1800. A data intake and query system instance can comprise an indexing system and a search system, where the indexing system includes one or more indexers 1820 and the search system includes one or more search heads 1860.

As depicted in FIG. 18, the self-managed network 1800 can include one or more data sources 1802. Data received from these data sources may be processed by an instance of the data intake and query system within self-managed network 1800. The data sources 1802 and the data intake and query system instance can be communicatively coupled to each other via a private network 1810.

Users associated with the entity can interact with and avail themselves of the functions performed by a data intake and query system instance using computing devices. As depicted in FIG. 18, a computing device 1804 can execute a network access application 1806 (e.g., a web browser), that can communicate with the data intake and query system instance and with data sources 1802 via the private network 1810. Using the computing device 1804, a user can perform various operations with respect to the data intake and query system, such as management and administration of the data intake and query system, generation of knowledge objects, and other functions. Results generated from processing performed by the data intake and query system instance may be communicated to the computing device 1804 and output to the user via an output system (e.g., a screen) of the computing device 1804.

The self-managed network 1800 can also be connected to other networks that are outside the entity's on-premise environment/network, such as networks outside the entity's data center. Connectivity to these other external networks is controlled and regulated through one or more layers of security provided by the self-managed network 1800. One or more of these security layers can be implemented using firewalls 1812. The firewalls 1812 form a layer of security around the self-managed network 1800 and regulate the transmission of traffic from the self-managed network 1800 to the other networks and from these other networks to the self-managed network 1800.

Networks external to the self-managed network can include various types of networks including public networks 1890, other private networks, and/or cloud networks provided by one or more cloud service providers. An example of a public network 1890 is the Internet. In the example depicted in FIG. 18, the self-managed network 1800 is connected to a service provider network 1892 provided by a cloud service provider via the public network 1890.

In some implementations, resources provided by a cloud service provider may be used to facilitate the configuration and management of resources within the self-managed network 1800. For example, configuration and management of a data intake and query system instance in the self-managed network 1800 may be facilitated by a software management system 1894 operating in the service provider network 1892. There are various ways in which the software management system 1894 can facilitate the configuration and management of a data intake and query system instance within the self-managed network 1800. As one example, the software management system 1894 may facilitate the download of software including software updates for the data intake and query system. In this example, the software management system 1894 may store information indicative of the versions of the various data intake and query system instances present in the self-managed network 1800. When a software patch or upgrade is available for an instance, the software management system 1894 may inform the self-managed network 1800 of the patch or upgrade. This can be done via messages communicated from the software management system 1894 to the self-managed network 1800.

The software management system 1894 may also provide simplified ways for the patches and/or upgrades to be downloaded and applied to the self-managed network 1800. For example, a message communicated from the software management system 1894 to the self-managed network 1800 regarding a software upgrade may include a Uniform Resource Identifier (URI) that can be used by a system administrator of the self-managed network 1800 to download the upgrade to the self-managed network 1800. In this manner, management resources provided by a cloud service provider using the service provider network 1892 and which are located outside the self-managed network 1800 can be used to facilitate the configuration and management of one or more resources within the entity's on-prem environment. In some implementations, the download of the upgrades and patches may be automated, whereby the software management system 1894 is authorized to, upon determining that a patch is applicable to a data intake and query system instance inside the self-managed network 1800, automatically communicate the upgrade or patch to self-managed network 1800 and cause it to be installed within self-managed network 1800.

Various examples and possible implementations have been described above, which recite certain features and/or functions. Although these examples and implementations have been described in language specific to structural features and/or functions, it is understood that the subject matter defined in the appended claims is not necessarily limited to the specific features or functions described above. Rather, the specific features and functions described above are disclosed as examples of implementing the claims, and other equivalent features and acts are intended to be within the scope of the claims. Further, any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/ steps described herein may be performed in any sequence and/or in any combination, and (ii) the components of respective embodiments may be combined in any manner.

Processing of the various components of systems illustrated herein can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Examples have been described with reference to flow chart illustrations and/or block diagrams of methods, apparatus (systems), and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

What is claimed is:

1. A method comprising:
generating, by a node, a key pair including a private key and a public key;
sending, by the node, a first request to a cloud-based configuration controller included in a cloud service infrastructure, the first request requesting creating a service principal that is to be associated with the node;
responsive to successfully creating the service principal, transmitting, by the node, a heartbeat message to the cloud-based configuration controller, the heartbeat message including first metadata indicative of a current configuration of a package that is executed by the node;
receiving, by the node, a heartbeat response message including second metadata indicating that the current configuration of the package is to be updated to a new configuration of the package;
sending, by the node, in response to receiving the heartbeat response message, a second request to a content delivery network included in the cloud service infrastructure to obtain the new configuration of the package; and
executing, by the node, the new configuration of the package obtained from the content delivery network, the executing including, installing the new configuration of the package on a server associated with the node.

2. The method of claim 1, wherein the package includes an application and one or more configuration settings associated with the application.

3. The method of claim 1, wherein the first metadata includes information identifying a version of an application included in the package or values of one or more configuration settings associated with the application.

4. The method of claim 1, wherein the first metadata further includes information corresponding to a health metric of the node.

5. The method of claim 1, wherein the second metadata includes a URL associated with the content delivery network included in the cloud service infrastructure from where the node downloads the new configuration of the package.

6. The method of claim 1, wherein the new configuration of the package corresponds to a new version of an application included in the package or new values of one or more configuration settings associated with the application.

7. The method of claim 1, wherein the heartbeat message is transmitted periodically from the node to the cloud-based configuration controller included in a cloud service at a predetermined transmission frequency.

8. The method of claim 1, further comprising:
obtaining, by the node, a service principal identifier; and
generating, by the node, a node identifier based on at least the service principal identifier and the private key.

9. The method of claim 8, wherein a first node identifier associated with a first node in a cluster of nodes is different than a second node identifier associated with a second node in the cluster of nodes.

10. One or more computer readable non-transitory media storing computer-executable instructions that, when executed by one or more processors, cause:
generating, by a node, a key pair including a private key and a public key;
sending, by the node, a first request to a cloud-based configuration controller included in a cloud service infrastructure, the first request requesting creating a service principal that is to be associated with the node;
responsive to successfully creating the service principal, transmitting, by the node, a heartbeat message to the cloud-based configuration controller, the heartbeat message including first metadata indicative of a current configuration of a package that is executed by the node;

receiving, by the node, a heartbeat response message including second metadata indicating that the current configuration of the package is to be updated to a new configuration of the package;

sending, by the node, in response to receiving the heartbeat response message, a second request to a content delivery network to obtain the new configuration of the package; and executing, by the node, the new configuration of the package obtained from the content delivery network, the executing including, installing the new configuration of the package on a server associated with the node.

11. The one or more computer readable non-transitory media storing computer-executable instructions of claim 10, wherein the package includes an application and one or more configuration settings associated with the application.

12. The one or more computer readable non-transitory media storing computer-executable instructions of claim 10, wherein the first metadata includes information identifying a version of an application included in the package or values of one or more configuration settings associated with the application.

13. The one or more computer readable non-transitory media storing computer-executable instructions of claim 10, wherein the first metadata further includes information corresponding to a health metric of the node.

14. The one or more computer readable non-transitory media storing computer-executable instructions of claim 10, wherein the second metadata includes a URL associated with the content delivery network included in the cloud service infrastructure from where the node downloads the new configuration of the package.

15. The one or more computer readable non-transitory media storing computer-executable instructions of claim 10, wherein the new configuration of the package corresponds to a new version of an application included in the package or new values of one or more configuration settings associated with the application.

16. The one or more computer readable non-transitory media storing computer-executable instructions of claim 10, wherein the heartbeat message is transmitted periodically from the node to the cloud-based configuration controller included in a cloud service at a predetermined transmission frequency.

17. The one or more computer readable non-transitory media storing computer-executable instructions of claim 10, further comprising instructions that, when executed by one or more processors, cause:

obtaining, by the node, a service-principal identifier;

generating, by the node, a node identifier based on at least the service-principal identifier and the private key, wherein a first node identifier associated with a first node in a cluster of nodes is different than a second node identifier associated with a second node in the cluster of nodes.

18. A method comprising:

receiving, by a cloud-based configuration controller included in a cloud service infrastructure, a first request from a node included in a customer enterprise, the first request requesting creating a service principal that is to be associated with the node, wherein the node generates a key pair including a private key and a public key, and wherein the service principal is to be created based on the key pair;

receiving, by the cloud-based configuration controller, a heartbeat message from the node, the heartbeat message including first metadata indicative of a current configuration of a package that is being executed by the node;

determining, by the cloud-based configuration controller that the current configuration of the package is to be updated to a new configuration of the package; and transmitting, by the cloud-based configuration controller, a heartbeat response message to the node, the heartbeat response message including second metadata indicative of the new configuration of the package that is to be downloaded by the node, and wherein the second metadata includes a URL associated with a content delivery network included in the cloud service infrastructure from where the node is to download the new configuration of the package, and wherein the node installs the new configuration of the package on a server associated with the node.

* * * * *